(12) United States Patent
Hashimoto et al.

(10) Patent No.: US 8,151,431 B2
(45) Date of Patent: Apr. 10, 2012

(54) ASSEMBLY MEMBER AND METHOD OF MANUFACTURING ASSEMBLY MEMBER

(75) Inventors: Yu Hashimoto, Toyota (JP); Yoshihiko Ukai, Toyota (JP); Keiichi Matsunaga, Anjo (JP)

(73) Assignees: Toyota Jidosha Kabushiki Kaisha, Toyota (JP); MEG Inc., Anjo-shi (JP)

( * ) Notice: Subject to any disclaimer, the term of this patent is extended or adjusted under 35 U.S.C. 154(b) by 428 days.

(21) Appl. No.: 12/309,818

(22) PCT Filed: Jul. 31, 2006

(86) PCT No.: PCT/JP2006/315176
§ 371 (c)(1),
(2), (4) Date: Feb. 24, 2009

(87) PCT Pub. No.: WO2008/015734
PCT Pub. Date: Feb. 7, 2008

(65) Prior Publication Data
US 2009/0324324 A1 Dec. 31, 2009

(51) Int. Cl.
*B21D 39/00* (2006.01)
*B23P 17/00* (2006.01)
(52) U.S. Cl. ........................ 29/505; 29/888.08
(58) Field of Classification Search ............... 29/888.08, 29/888.09, 505
See application file for complete search history.

(56) References Cited

U.S. PATENT DOCUMENTS

| | | | |
|---|---|---|---|
| 2,056,309 A | 10/1936 | Osenberg | |
| 4,421,497 A | 12/1983 | Federmann et al. | |
| 4,666,345 A | 5/1987 | Seegmiller | |
| 4,922,785 A | 5/1990 | Arnold et al. | |
| 2002/0041790 A1 | 4/2002 | Suzuki et al. | |
| 2002/0195291 A1 | 12/2002 | Nonogaki | |

FOREIGN PATENT DOCUMENTS

| | | |
|---|---|---|
| FR | 2 687 093 | 8/1993 |
| JP | U 50-152028 | 12/1975 |

(Continued)

OTHER PUBLICATIONS

Office Action issued in CN 200680055510.2, issued Dec. 21, 2010. (with English-language translation).

(Continued)

*Primary Examiner* — David Bryant
*Assistant Examiner* — Moshe Wilensky
(74) *Attorney, Agent, or Firm* — Oliff & Berridge, PLC

(57) ABSTRACT

Technology which enables a first member and a second member to be fastened together strongly is provided. A bar-shaped section is formed on the first member, a hole is formed in the second member, and the bar-shaped section of the first member is pressure fitted into the hole of the second member. Here, the diameter of the circumscribed circle which circumscribes the cross-section perpendicular to the axis of the bar-shaped section is made greater than the diameter of the inscribed circle which inscribes the cross-section perpendicular to the axle of the hole. The diameter of the inscribed circle which inscribes the cross-section perpendicular to the axis of the bar-shaped section is made smaller than the diameter of the circumscribed circle which circumscribes the cross-section perpendicular to the axle of the hole. A tapered section, in which the side face is inclined with respect to the axial direction, is formed in the side face of the harder of the bar-shaped section and the hole, in the end portion which is positioned to the forward side during pressure fitting.

3 Claims, 29 Drawing Sheets

FOREIGN PATENT DOCUMENTS

| | | |
|---|---|---|
| JP | U 51-109369 | 9/1976 |
| JP | U-57-134410 | 8/1982 |
| JP | A-58-030510 | 2/1983 |
| JP | U-60-088110 | 6/1985 |
| JP | A-60-129412 | 7/1985 |
| JP | A 63-89229 | 4/1988 |
| JP | U 2-80224 | 6/1990 |
| JP | A 3-297600 | 12/1991 |
| JP | A 4-69407 | 3/1992 |
| JP | A 7-259838 | 10/1995 |
| JP | A 8-74871 | 3/1996 |
| JP | A 8-121120 | 5/1996 |
| JP | A 9-158952 | 6/1997 |
| JP | A 9-287677 | 11/1997 |
| JP | A 11-320274 | 11/1999 |
| JP | A 2002-126837 | 5/2002 |
| JP | A 2003-4060 | 1/2003 |
| JP | A 2003-161332 | 6/2003 |
| JP | A 2004-195475 | 7/2004 |

OTHER PUBLICATIONS

Mar. 22, 2011 Japanese Office Action for Application No. 2005-024184 w/Translation.
New U.S. Patent Application filed Jan. 30, 2009 in the name of Hashimoto et al.
International Search Report issued in related International Application No. PCT/JP2006/315177, mailed Oct. 31, 2006. (with English-language translation).
International Preliminary Report on Patentability issued in related International Application No. PCT/JP2006/315177, dated Sep. 26, 2008. (with English-language translation).
International Preliminary Report on Patentability issued in corresponding International Application No. PCT/JP2006/315176, Dated Sep. 26, 2008. (with English-language translation).
Office Action issued in corresponding Japanese Patent Application No. 2005-024184, mailed Jun. 1, 2010. (with English-language translation).
Office Action issued in corresponding Chinese Application No. 200680055494.7, mailed May 18, 2010. (with English-language translation).
Office Action issued in corresponding Chinese Application No. 200680055510.2, mailed Apr. 27, 2010. (with English-language translation).
Jun. 29, 2011 Office Action issued in Chinese Application No. 200680055494.7 w/partial translation.
Jun. 27, 2011 Office Action issued in U.S. Appl. No. 12/309,812.
Jan. 17, 2012 Office Action issued in Japanese Patent Application No. 2008-527609 (with translation).

ASSEMBLY MEMBER AND METHOD OF MANUFACTURING ASSEMBLY MEMBER

BACKGROUND OF THE INVENTION

1. Field of the Invention

The present invention relates to technology for fastening together a pair of members.

2. Description of the Related Art

Japanese Patent Application Publication No. 63-89229 discloses technology for pressure fitting a bar-shaped infitting section which is formed with a triangular toothed serrations into a pipe and thereby fastening respective members together. In this technology, the infitting section is made with a greater hardness than the pipe. When the infitting section is pressure fitted into the pipe, then the infitting section and the pipe become fastened together by means of the peaks of the triangular tooth serrations piercing into the inner circumferential surface of the pipe.

SUMMARY OF THE INVENTION

In the prior art technology as described above, when the bar-shaped infitting section is pressure fitted into the pipe, the scraped material of the pipe is easily pushed inward in the pressure fitting direction, and the scraped pipe material that pliably moves cannot be induced to sufficiently fill in between the triangular teeth. Therefore, it may not be possible to firmly fasten the infitting section and the pipe together.

The present invention resolves the above described problem, by providing a technology which enables the pair of members to be firmly fastened together.

The technology according to the present invention can be realized in a method of manufacturing an assembly member in which a first member and a second member are fastened together. This method of manufacture comprises a step of forming a bar-shaped section on the first member; a step of forming a hole in the second member; and a step of pressure fitting the bar-shaped section of the first member into the hole formed in the second member. Here, the diameter of the circumscribed circle which circumscribes the cross-section perpendicular to the axis of the bar-shaped section is determined to be greater than the diameter of the inscribed circle which inscribes the cross-section perpendicular to the axle of the hole. Furthermore, the diameter of the inscribed circle which inscribes the cross-section perpendicular to the axis of the bar-shaped section is determined to be smaller than the diameter of the circumscribed circle which circumscribes the cross-section perpendicular to the axle of the hole. A tapered section in which the cross-section perpendicular to the axis reduces in the pressure fitting direction of the bar-shaped section is formed on the side face of one of the bar-shaped section and the hole that has greater hardness.

In this method of manufacture, when the bar-shaped section formed on the first member is pressure fitted into the hole formed in the second member, then the side face of the bar-shaped section and the side face of the hole interfere with each other in a partial range in the circumferential direction, and are separated from each other in a partial range in the circumferential direction. In the range where the side face of the bar-shaped section interfere with the side face of the hole, principally, the side face having the greater hardness deformingly pushes back the material that composes the side faces with lower hardness, and carves into the side face of lower hardness. In this case, since the tapered section is formed on the side face of the one of the bar-shaped section and the hole with greater hardness, then the material forming the side face with the lower hardness is not pushed towards to a great extent in the pressure fitting direction, but rather malleably deformed and flown in the circumferential direction and the diametrical direction. By this means, in the range where the side face of the bar-shaped section and the side face of the hole are separated, the side face having lower hardness is risen upon the side face with greater hardness, and the side face having greater hardness carves into the side face with lower hardness to a greater extent. By this means, the bar-shaped section of the first member and the hole of the second member are tightly fastened together.

By means of this method of manufacture, it is possible to manufacture an assembly member in which a first member and a second member are firmly fastened together.

In the method of manufacture as described above, a polygon-shaped cross-section perpendicular to the axis may be adopted for the side face of one of the bar-shaped section and the hole that has greater hardness. In this case, desirably, a tapered section in which the cross-section perpendicular to the axis reduces in the direction of pressure fitting of the bar-shaped section is formed in the end section on the side where pressure fitting starts.

Alternatively, projections extending in the axial direction can be formed repeatedly in the circumferential direction on the side face of one of the bar-shaped section and the hole with greater hardness. In this case, desirably, the height of the peaks of the projections is made shorter in the end section positioned on the side where pressure fitting starts and is made taller in the end section positioned on the side opposite to the side where pressure fitting starts. More preferably, the height of the peaks is continuous from the end section on the forward side to the end section on the backward side. Here, the fact that the height of the peaks of the projections is continuous means that the height of the peaks does not change in the direction perpendicular to the axis.

If a method of forming projections is adopted, then the projections which extend in the axial direction desirably comprise a portion in which the height of the peaks increases uniformly in the axial direction and a portion in which the height of the peaks remains uniform in the axial direction, these portions being formed in a continuous fashion. By this means, it is possible to restrict variation in the coupling force, when manufacturing a plurality of assembly members having the same specifications.

Desirably, two inclined surfaces which extend to both sides in the circumferential direction from the peak of each projection extending in the axial direction are asymmetrical with respect to the radius which passes through the central axis and the peak of the projection.

If the two inclined surfaces extending to either side in the circumferential direction from the peak of each projection extending in the axial direction are asymmetrical with respect to the radius which passes through the central axis and the peak, then the coupling strength of the first member and the second member in respect of axial rotation may differ depending on the direction in which the torque is applied. That is, the fastening strength when torque is applied in one direction is stronger than the fastening strength when torque is applied in the other direction. Thus, it is possible to achieve a state where the fastening strength varies with the direction of application of torque.

Desirably, walls extending partially along a circular circumference which passes through the intermediate height between the peak and trough of the projections are formed at a plurality of positions having rotational symmetry, on the side face of the harder of the bar-shaped section and the hole.

Here, rotational symmetry means that the walls extending partially in the circumferential direction are formed equidistantly at three or more positions on the circumference of a circle; and when the vectors passing from the center to the partial walls are summed together, the result is a zero vector.

If walls are formed along the circular circumference at a plurality of positions forming rotational symmetry, then it is possible to ensure that the bar-shaped section of the first member and the hole of the second member are coaxial.

In the method of manufacture as described above, desirably, a member having a lower hardness than the side face of the bar-shaped member and the side face of the hole is interposed between the side face of the bar-shaped member and the side face of the hole, when the bar-shaped section of the first member is pressure fitted into the hole of the second member.

In this method of manufacture, the interposed member deforms plastically and fills in the gaps formed between the side face of the bar-shaped section and the side face of the hole. The residual stress of the interposed member is applied to the side face of the bar-shaped section and the side face of the hole, thereby increasing the fastening torque of the side face of the bar-shaped section and the side face of the hole.

In the method of manufacture described above, desirably, the side face of the bar-shaped section of the first member has greater hardness than the side face of the hole of the second member, and the bar-shaped section of the first member is pressure fitted into the hole in the second member in a state where the outer circumference of the second member is constricted by a mold.

According to this method of manufacture, the contact surface area between the side face of the bar-shaped section and the side face of the hole is increased and the fastening force between the first member and the second member can be increased.

In the method of manufacture as described above, desirably, the side face of the bar-shaped section of the first member has greater hardness than the side face of the hole of the second member, and the bar-shaped section of the first member is pressure fitted into the hole in the second member in a state where the outer circumference and a portion of the end face of the second member is constricted by a mold, and the remainder of the end face is in a plastically deformable state.

The members are pressure fitted in a state where one portion of the end face of the second member is constricted and the remainder is in a plastically deformable state, it is possible to stabilize the fastening force of the first member and the second member.

By means of the method of manufacture as described above, it is possible to manufacture an assembly member in which a first member and a second member are firmly fastened together. This assembly member has the following characteristic features that are obtained by utilizing one of the methods of manufacture as described above. More specifically, this assembly member is an assembly member in which a first member and a second member are fastened together, in which a bar-shaped section is formed on the first member and a hole into which the bar-shaped section is pressure fitted is formed in the second member. The side face of the bar-shaped section and the side face of the hole abut against each other in a range of a portion of the circumferential direction, and are separated from each other in another range of a portion in the circumferential direction. A tapered section in which the cross-section perpendicular to the axis is reduced in the pressure fitting direction of the bar-shaped section is formed in the side face of one of the bar-shaped section and the hole that has greater hardness. Furthermore, a plastically deformed portion, which is created with material that had deformed plastically and flown into the space between the side face of the bar-shaped section and the side face of the hole, is formed on the side face of one of the bar-shaped section and the hole that has smaller hardness.

BRIEF DESCRIPTION OF THE DRAWINGS

FIG. 6A shows a bar-shaped section which has a triangular cross-sectional shape perpendicular to the axis, FIG. 6B shows a bar-shaped section which has a hexagonal cross-sectional shape perpendicular to the axis, and FIG. 6C shows a cross-shaped section which has a hexagonal cross-sectional shape perpendicular to the axis;

DESCRIPTION OF THE PREFERRED EMBODIMENTS (First Embodiment)

Figure 1:
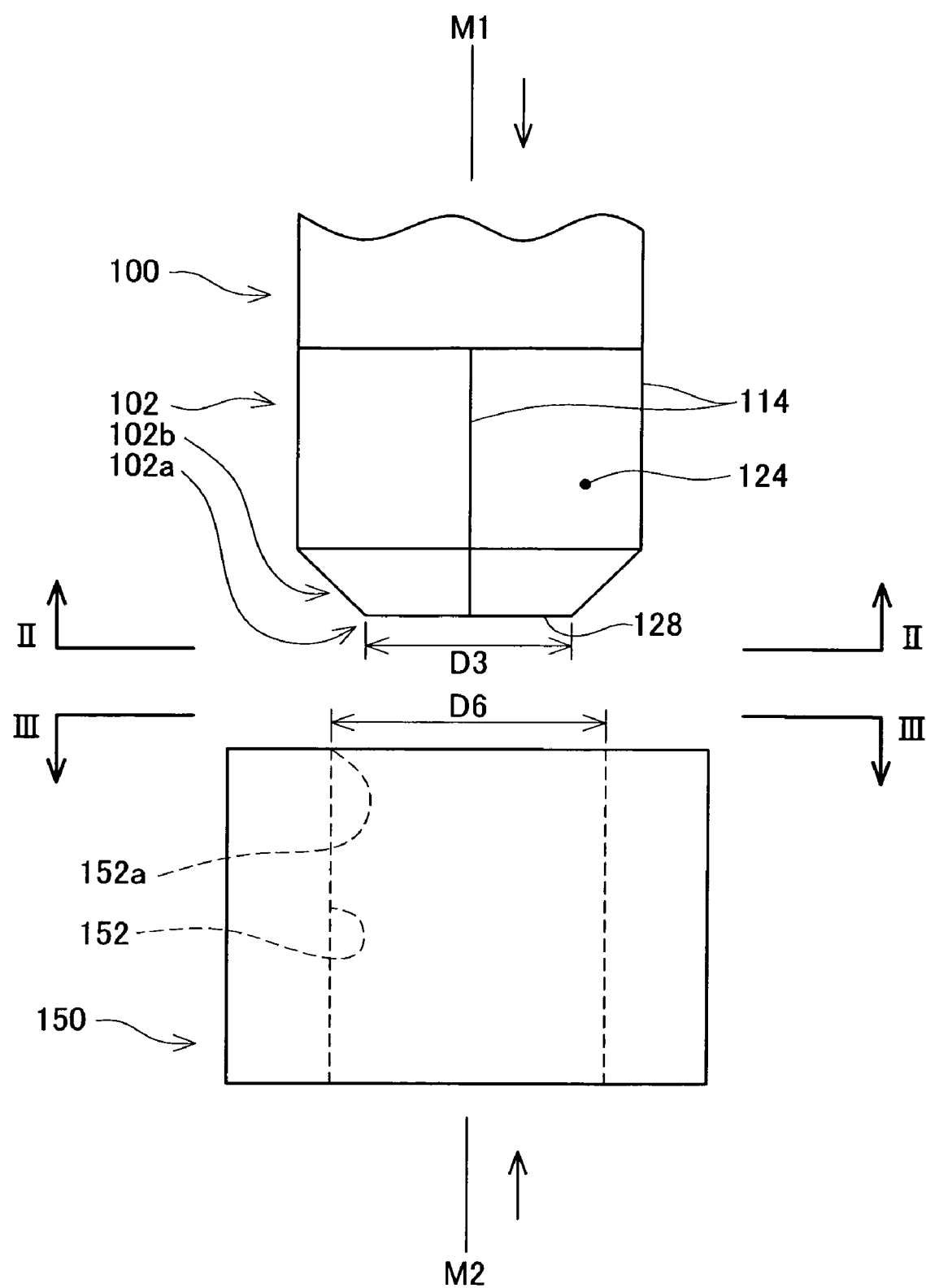
FIG. 1 shows a bar-shaped section of a first member and a hole of a second member (first embodiment)

One embodiment of the present invention is described below with reference to the drawings. In the present embodiment, technology for fastening together a first member 100 and a second member 150 shown in FIG. 1 is described. As shown in FIG. 1, a bar-shaped section 102 extending along axis M1 is formed on the first member 100. A hole 152 extending along axis M2 is formed in the second member 150. The first member 100 and the second member 150 are fastened to each other by pressure fitting the bar-shaped section 102 of the first member 100 into the hole 152 of the second member 150. When pressure fitting the bar-shaped section 102 into the hole 152, the front end 102a of the bar-shaped section 102 is inserted under pressure via one end 152a of the hole 152.

Figure 2:
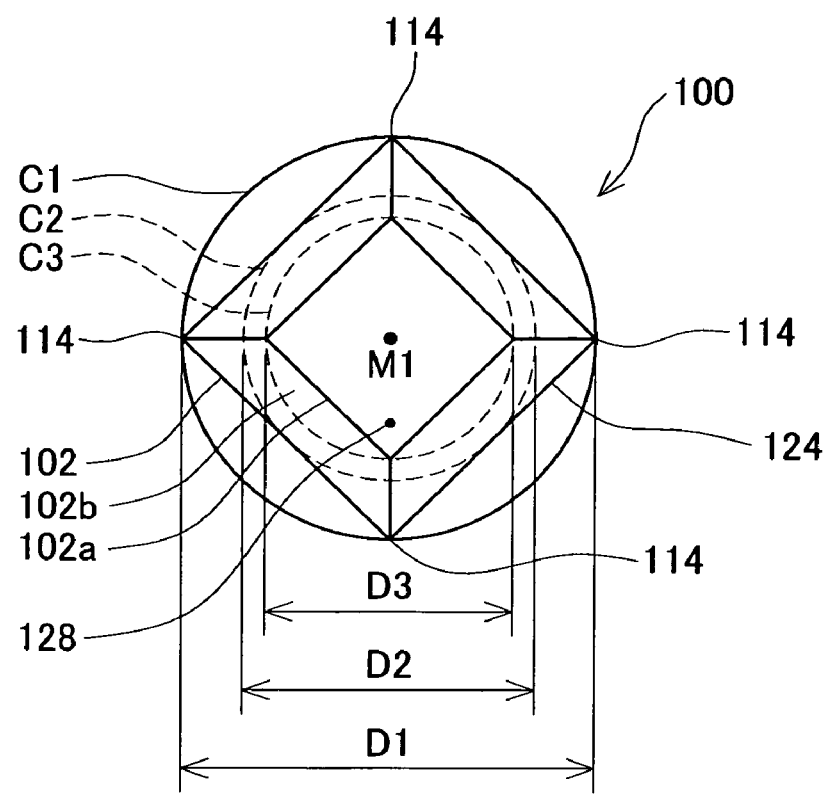
FIG. 2 shows a diagrammatic view in the direction of line II-II in FIG. 1.

As shown in FIG. 1 and FIG. 2, the bar-shaped section 102 of the first member 100 is of a square bar shape having a square-shaped cross-section perpendicular to the axis M1 (i.e. lateral cross-section). Four peaks 114 extending in the direction of axis M1 are formed on the side faces 124 of the bar-shaped section 102. A tapered section 102b is formed on the front end 102a side of the bar-shaped section 102. In the tapered section 102b, the lateral-cross section becomes smaller toward the front end 102a, and the peaks 114 and side faces 124 are inclined with respect to the axis M1. D1 in FIG. 2 indicates the diameter of the circumscribed circle C1 which circumscribes the lateral cross-section of the bar-shaped section 102. D2 in FIG. 2 indicates the diameter of the inscribed circle C2 which inscribes the lateral cross-section of the bar-shaped member 102. D3 in FIG. 2 indicates the diameter of the circumscribed circle C3 which circumscribes the lateral cross-section (in other words, the front end surface 128) of the front end section 108 of the bar-shaped member 102.

Figure 3:
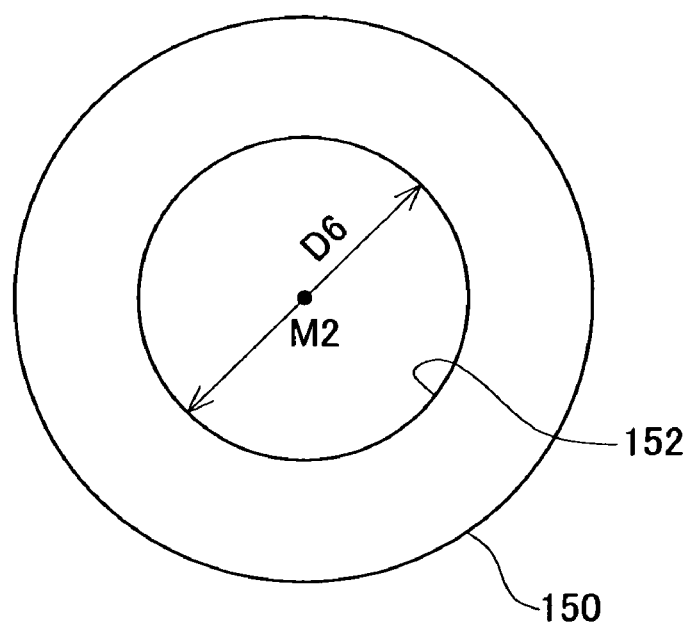
FIG. 3 shows a diagrammatic view in the direction of line III-III in FIG. 1.

As shown in FIG. 1 and FIG. 3, the hole 152 in the second member 150 has a circular cross-section perpendicular to the axis M2 (i.e. lateral cross-section). The lateral cross-section of the hole 152 is uniform in the direction of the axis M2 and this diameter is D6. Since the lateral cross-section of the hole 152 is circular, then the diameter of the circumscribed circle which circumscribes the lateral cross-section of the hole 152 and the diameter of the inscribed circle which inscribes the lateral cross-section of the hole 152 are both D6.

In the bar-shaped section 102 of the first member 100, the diameter D1 of the circumscribed circle of the lateral cross-section is designed to be of a greater dimension than the diameter D6 of the hole 152 of the second member 150, and the diameter D2 of the inscribed circle of the lateral cross-section is designed to be of a smaller dimension than the diameter D6 of the hole 152 in the second member 150. Furthermore, in the tapered section 102b of the bar-shaped section 102 of the first member 100, the lateral cross-section of the bar-shaped section 102 reduces in such a manner that the diameter D3 of the circumscribed circle of the lateral cross-section (in other words, the front end surface 128) of the front end 102a of the bar-shaped section 102 is smaller than the diameter D6 of the lateral cross-section of the hole 152 of the second member. In the tapered section 102b, the lateral cross-section gradually reduces in a uniform manner in the direction of pressure fitting of the bar-shaped section 102.

A material having greater hardness than that of the second member 150 is used for the first member 100. Furthermore, the hardness of the side faces 124 of the bar-shaped section 102 of the first member 100 is strengthened by high-frequency quenching. Thereby, the side faces 124 of the bar-shaped section 102 of the first member 100 have even greater hardness than the side face of the hole 152 of the second member 150. The first member 100 and the second member 150 can be made of steel, aluminum, copper, or the like. The first member 100 and the second member 150 can be formed by forging, for example. It is possible to carry out a forming treatment, such as plating or chemical film deposition, on the side faces 124 of the bar-shaped section 102 of the first member 100 and the side face of the hole 152 of the second member 150.

Figure 4:
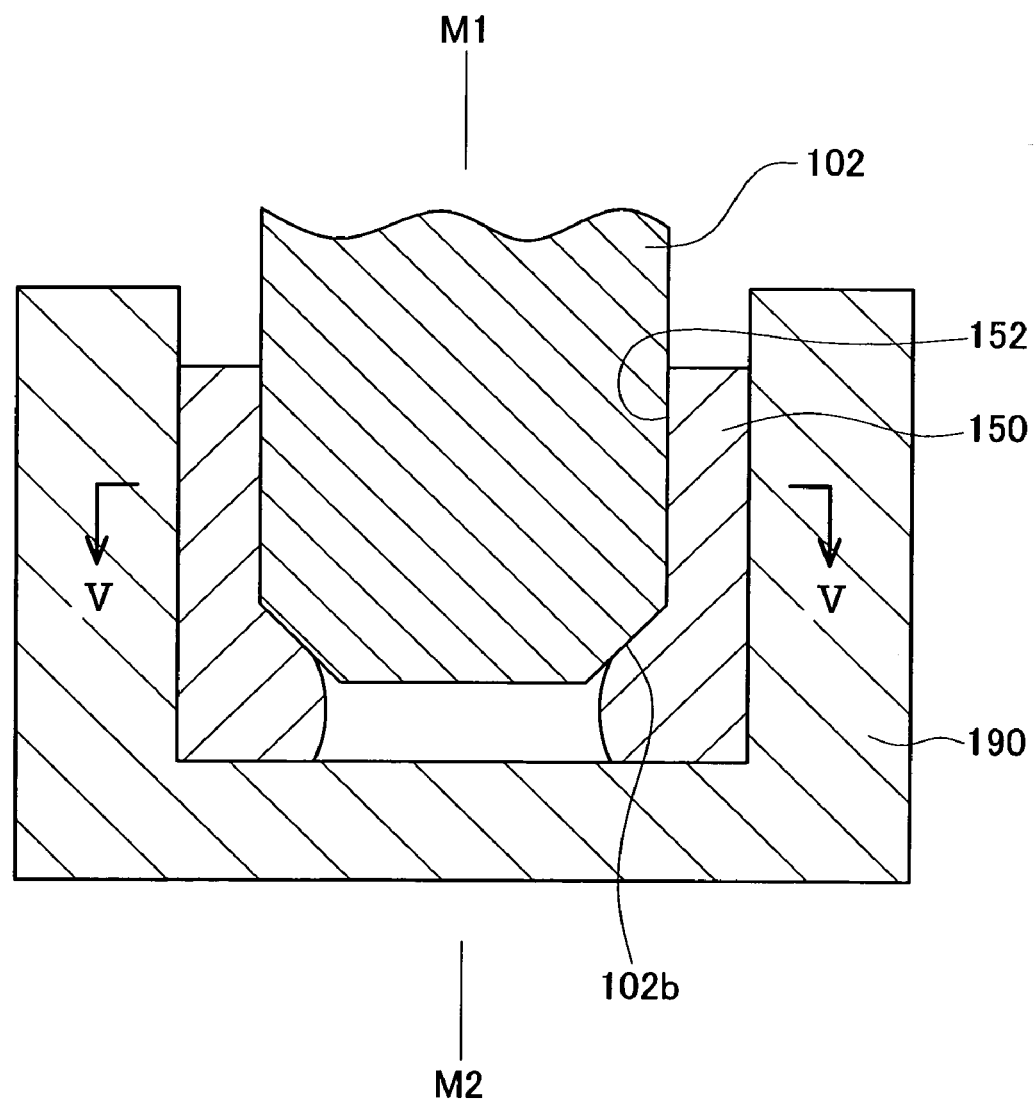
FIG. 4 shows a state in which a bar-shaped section of a first member has been pressure fitted into a hole of a second member (first embodiment)
Figure 5:
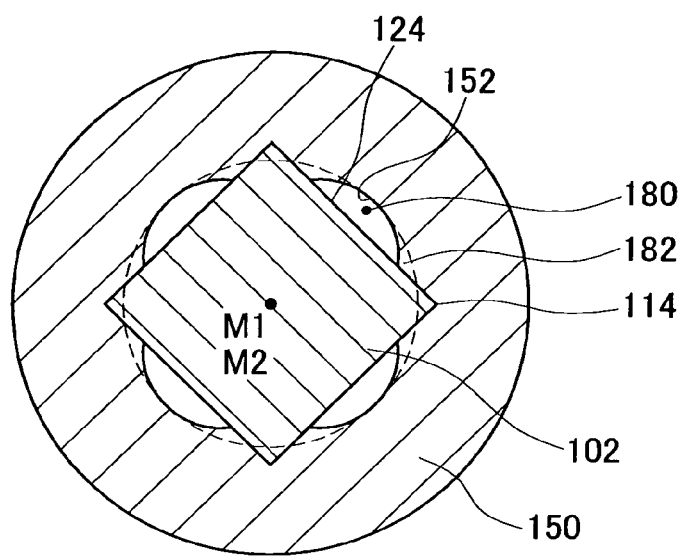
FIG. 5 is a cross-sectional view along line V-V in FIG. 4.

FIG. 4 and FIG. 5 each show a state where the bar-shaped section 102 of the first member 100 has been pressure fitted into the hole 152 of the second member 150. As shown in FIG. 4, in this pressure fitting step, while the second member 150 is supported by a mold 190 or the like, the axis M1 of the bar-shaped section 102 and the axis M2 of the hole 152 are coaxially aligned, and the first member 100 and the second member 150 are brought towards each other along the axes M1 and M2. As stated previously, the diameter D1 of the circumscribed circle of the lateral cross-section of the bar-shaped member 102 is larger than the diameter D6 of the hole 152, and the diameter D2 of the inscribed circle of the bar-shaped member 102 is smaller than the diameter D6 of the hole 152. Consequently, as shown in FIG. 5, when the bar-shaped section 102 is pressure fitted into the hole 152, a portion of each side face 124 of the bar-shaped section 102 (and more precisely, in the vicinity of the respective peaks 114) makes contact with the side face of the hole 152, while at the same time other portion of each side face 124 of the bar-shaped section 102 is separated from the side face of the hole 152 and forms gaps 180 respectively therebetween. Since the side faces 124 of the bar-shaped section 102 have a higher hardness than the side face of the hole 152, then the side face of the hole 152 undergoes large plastic deformation. The side faces 124 of the bar-shaped section 102 also undergo plastic deformation, but to a lesser extent. Since the tapered section 102b where the peaks 114 and the side faces 124 are inclined is provided on the front end 102a side of the bar-shaped section 102, then the portion of the second member 150 which has deformed plastically does not greatly flow downwards, but does flow to a great extent into the inside of the gaps 180 between the bar-shaped section 102 and the hole 152. The portion 182 which has flown plastically into the gaps 180 is processed and cured, thereby having its hardness strengthened. Due to the plastically deformed portion 182 of the second member 150 having flown into the gaps 180, which is processed and cured during the process of plastic deformation, the first member 100 and the second member 150 are thereby firmly fastened together.

Figure 6:
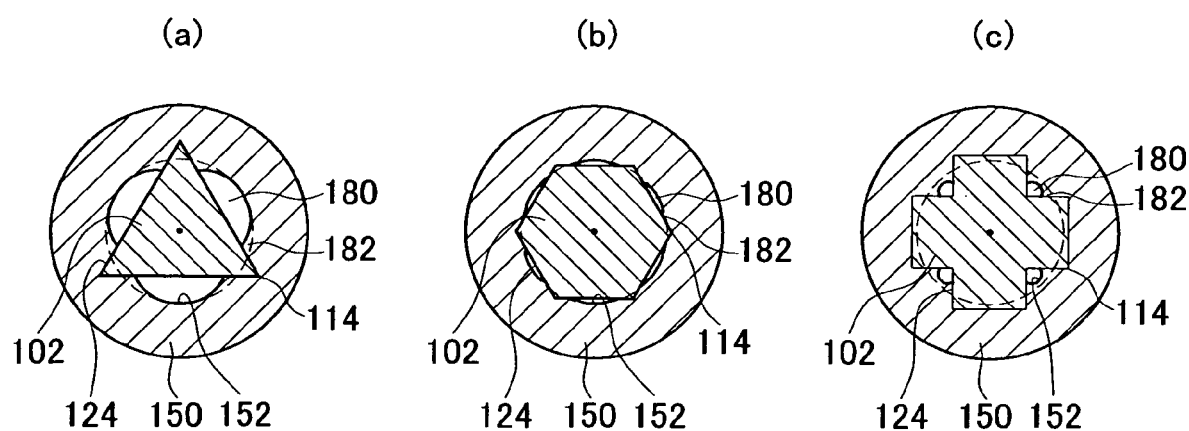
FIGS. 6A to 6C are diagrams showing modification examples of the bar-shaped section of the first member.

The bar-shaped section 102 of the first member 100 is not limited to having a square shaped lateral cross-section. For example, it may be formed with a triangular lateral cross-section as shown in FIG. 6A, a hexagonal lateral cross-section as shown in FIG. 6B, or a substantially cross-shaped polygonal lateral cross-section, as shown in FIG. 6C. The diameter D1 of the circumscribed circle of the lateral cross-section of the bar-shaped section 102 should be made greater than the diameter D6 of the hole 152, and furthermore, the diameter D2 of the inscribed circle thereof should be made smaller than the diameter D6 of the hole 152. In any case as above, when the bar-shaped section 102 is pressure fitted into the hole 152, a portion of each side face 124 of the bar-shaped section 102 (and more precisely, the vicinity of the peaks 114) carves into the side face of the hole 152, while at the same time other portion of each side face 124 of the bar-shaped section 102 is separated from the side face of the hole 152 and forms gaps 180. Due to the plastically deformed portion 182 of the second member 150 that had malleably flown into the gaps 180 and been processed and cured during the process of plastic deformation, the first member 100 and the second member 150 are fastened together strongly.

(Second Embodiment)

Figure 7:
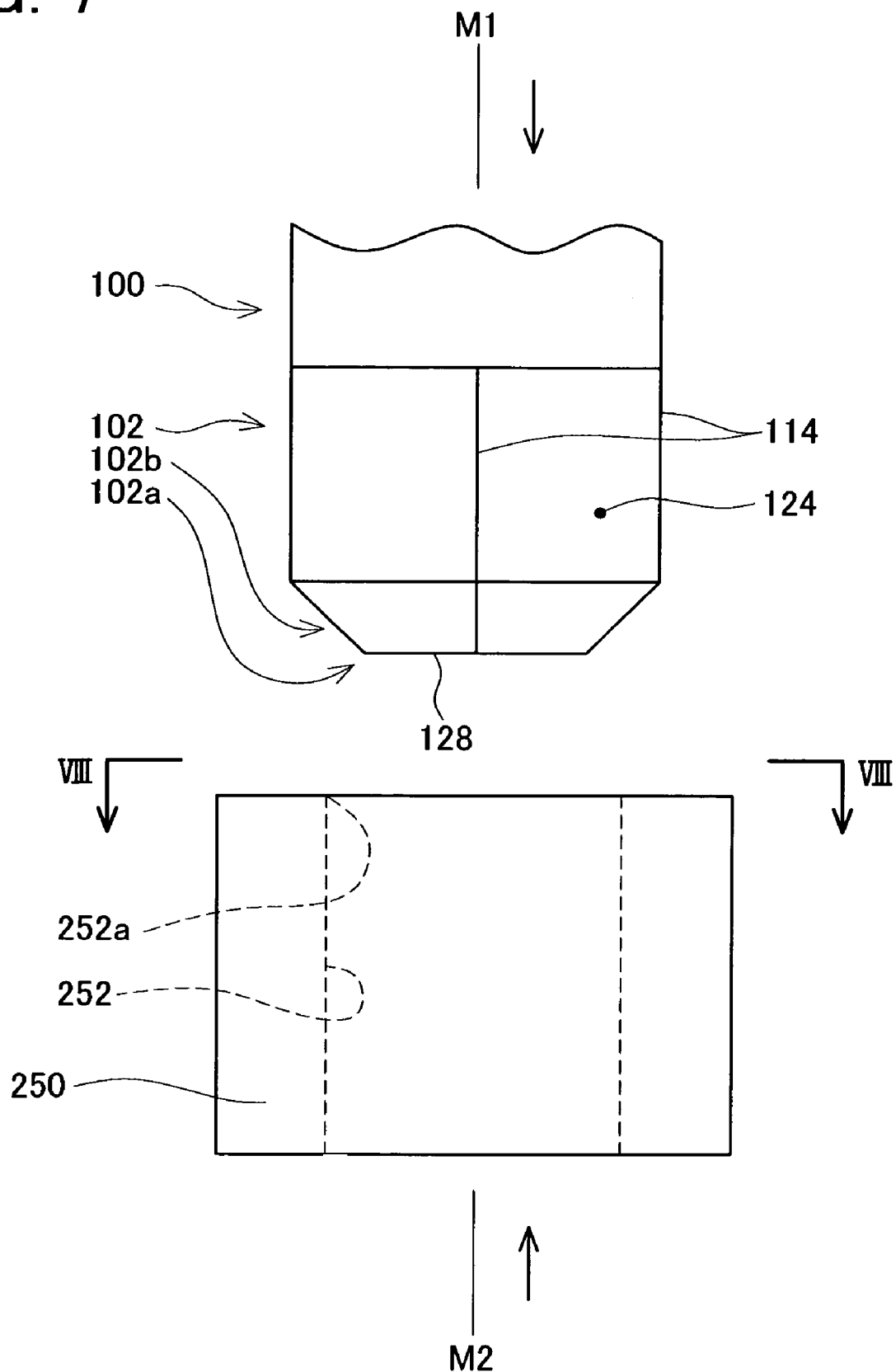
FIG. 7 shows a bar-shaped section of a first member and a hole of a second member (second embodiment)

A second embodiment of the present invention is described below with reference to the drawings. In the present embodiment, technology for fastening together the first member 100 and the second member 250 shown in FIG. 7 is described. The first member 100 herein is the same as in the first embodiment, and the second member 250 is different therefrom. As shown in FIG. 7, a hole 252 extending along axis M2 is formed on the second member 250. The first member 100 and the second member 250 are fastened to each other by pressure fitting the bar-shaped section 102 of the first member 100 into the hole 252 of the second member 250. When pressure fitting the bar-shaped section 102 into the hole 252, the front end 102a of the bar-shaped section 102 is inserted under pressure via one end 252a of the hole 252.

Figure 8:
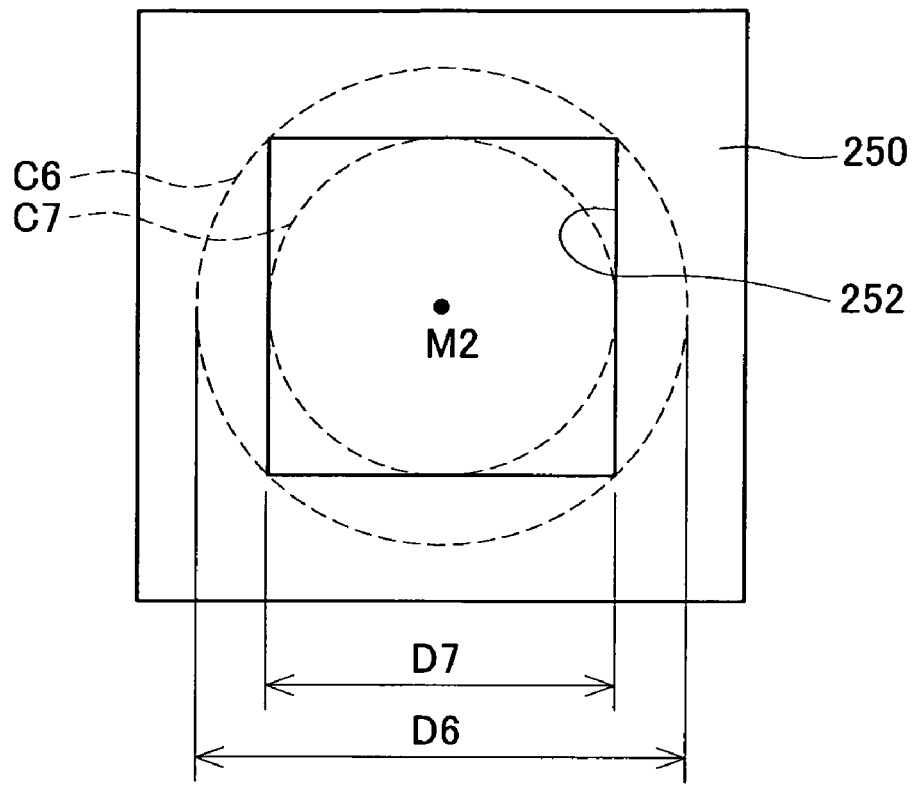
FIG. 8 shows a diagrammatic view in the direction of line VIII-VIII in FIG. 7.

As shown in FIG. 7 and FIG. 8, the hole 252 in the second member 250 has a square cross-section perpendicular to the axis M2 (i.e. lateral cross-section). The lateral cross-section of the hole 252 is uniform in the direction of the axis M2. D6 in FIG. 8 indicates the diameter of the circumscribed circle C6 which circumscribes the lateral cross-section of the hole 252. D7 in FIG. 2 indicates the diameter of the inscribed circle C7 which inscribes the lateral cross-section of the hole 252.

The lateral cross-section of the bar-shaped section 102 of the first member 100 and the lateral cross-section of the hole 252 of the second member 250 are both square, and are of equal size. Consequently, the diameter D1 of the circumscribed circle of the lateral cross-section of the bar-shaped section 102 of the first member 100 is equal to the diameter D6 of the circumscribed circle of the lateral cross-section of the hole 252 of the second member 250 and is greater than the diameter D7 of the inscribed circle of the lateral cross-section of the hole 252 of the second member 250. Furthermore, the diameter D2 of the inscribed circle of the lateral cross-section of the bar-shaped section 102 of the first member 100 is equal to the diameter D7 of the inscribed circle of the lateral cross-section of the hole 252 of the second member 250 and is smaller than the diameter D6 of the circumscribed circle of the lateral cross-section of the hole 252 of the second member 250. Moreover, the diameter D3 of the circumscribed circle of the front end face 128 of the first member 100 is smaller than the diameter D7 of the inscribed circle of the hole 252 of the second member 250.

The side faces 124 of the bar-shaped section 102 of the first member 100 have a greater hardness than the side face of the hole 252 of the second member 250.

Figure 9:
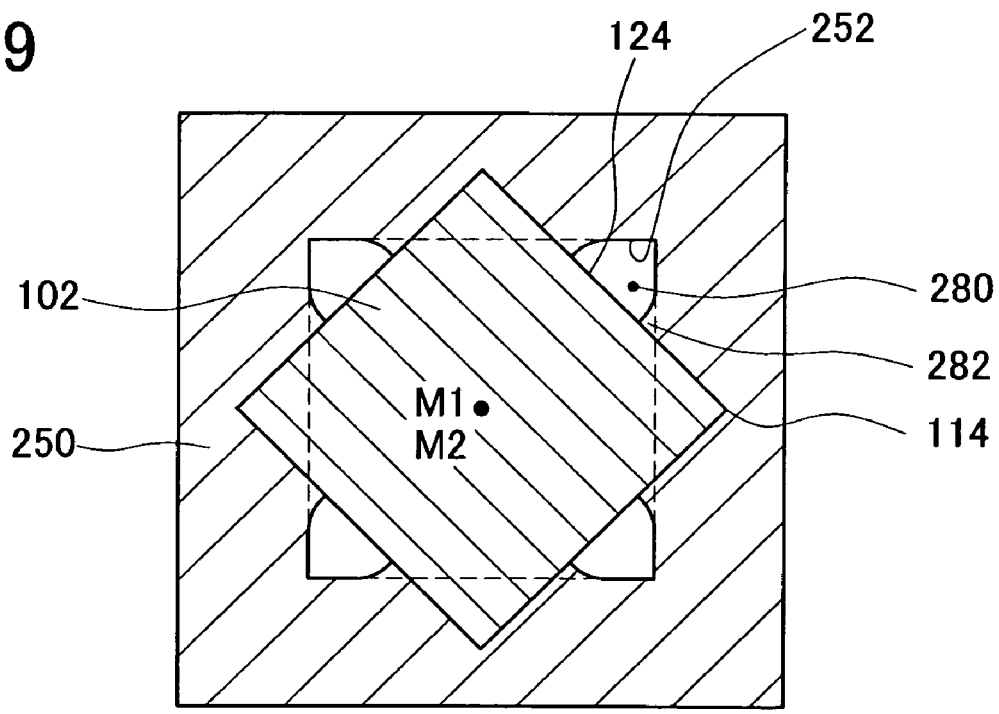
FIG. 9 is a cross-sectional diagram showing a state where a bar-shaped section of a first member has been pressure fitted into a hole of a second member (second embodiment)

FIG. 9 shows a state where the bar-shaped section 102 of the first member 100 has been pressure fitted into the hole 252 of the second member 250. As stated previously, the diameter D1 of the circumscribed circle of the lateral cross-section of the bar-shaped section 102 of the first member 100 is greater than the diameter D7 of the inscribed circle of the lateral cross-section of the hole 252 of the second member 250, and the diameter D2 of the inscribed circle of the lateral cross-section of the bar-shaped section 102 of the first member 100 is smaller than the diameter D6 of the circumscribed circle of the lateral cross-section of the hole 252 of the second member 250. Consequently, by rotating the bar-shaped section 102 and the hole 252 about their axes to create a phase difference of 45 degrees when the bar-shaped section 102 is pressure fitted into the hole 252, a portion of each side face 124 of the bar-shaped section 102 (and more specifically, in the vicinity of the respective peaks 114) abuts against the side faces of the hole 252, while other portion of each side face 124 of the bar-shaped section 102 is separated from the side faces of the hole 252 and thereby forming a gap 280. The side faces 124 of the bar-shaped section 102 have greater hardness than the side faces of the hole 252, and therefore the peaks 114 of the bar-shaped section 102 carve into the side faces of the hole 252, and the side faces of the hole 252 undergo a greatly pliant plastic deformation. The side faces 124 of the bar-shaped section 102 also undergo plastic deformation, but to a lesser extent. Since the tapered section 102b where the peaks 114 and the side faces 124 are inclined is provided on the front end 102a side of the bar-shaped section 102, then the portion of the second member 250 which has deformed plastically does not greatly flow downwards, but does flow to a great extent into the inside of the gaps 280 between the bar-shaped section 102 and the hole 252. The portion 282 which has flowed plastically into the gaps 280 is processed and cured, thereby strengthening its hardness. Due to the plastically deformed portion 282 of the second member 250 flowing into the gaps 280, and being processed and cured during the process of plastic deformation, the first member 100 and the second member 250 are firmly fastened together.

The bar-shaped section 102 of the first member 100 is not limited to having a square shaped lateral cross-section. Similarly, the hole 252 of the second member 250 is not limited to having a square shaped lateral cross-section. The lateral cross-section of the bar-shaped section 102 and the lateral cross-section of the hole 252 may be formed respectively to a triangular shape, square shape, pentagonal shape, etc. The lateral cross-section of the bar-shaped section 102 and the lateral cross-section of the hole 252 may have the same shape and dimensions. Alternatively, they may have the same shape and different dimensions, or they may have different shapes and different dimensions. In any case, the diameter D1 of the circumscribed circle of the lateral cross-section of the bar-shaped section 102 should be greater than the diameter D7 of the inscribed circle of the lateral cross-section of the hole 252, and the diameter D2 of the inscribed circle of the lateral cross-section of the bar-shaped section 102 should be smaller than the diameter D6 of the circumscribed circle of the lateral cross-section of the hole 252. By this configuration, it is possible to pressure fit the bar-shaped section 102 into the hole 152 in such a manner that a portion of each side face 124 of the bar-shaped section 102 abuts against a side face of the hole 252, and other portion of each side face 124 of the bar-shaped section 102 is separated from the respective side faces of the hole 252 thereby forming gaps 280 in between.

(Third Embodiment)

Figure 10:
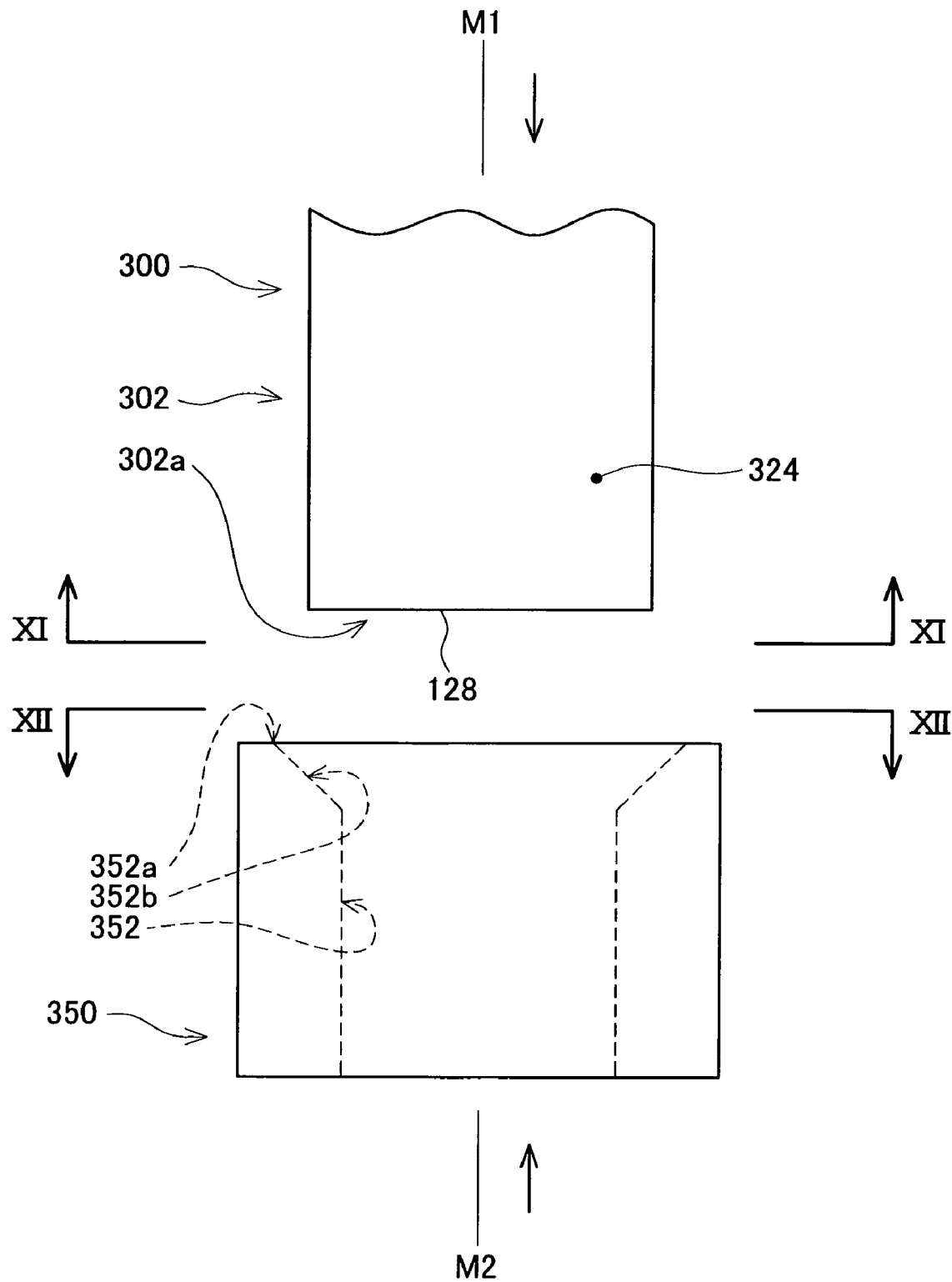
FIG. 10 shows a bar-shaped section of a first member and a hole of a second member (third embodiment)

A third embodiment of the present invention is described below with reference to the drawings. In the present embodiment, technology for fastening together the first member 300 and the second member 350 shown in FIG. 10 is described. As shown in FIG. 10, a bar-shaped section 302 extending along axis M1 is formed on the first member 300. A hole 352 extending along axis M2 is formed in the second member 350. The first member 300 and the second member 350 are fastened to each other by pressure fitting the bar-shaped section 302 of the first member 300 into the hole 352 of the second member 350. When pressure fitting the bar-shaped section 302 into the hole 352, the front end 302a of the bar-shaped section 302 is inserted under pressure via one end 352a of the hole 352.

Figure 11:
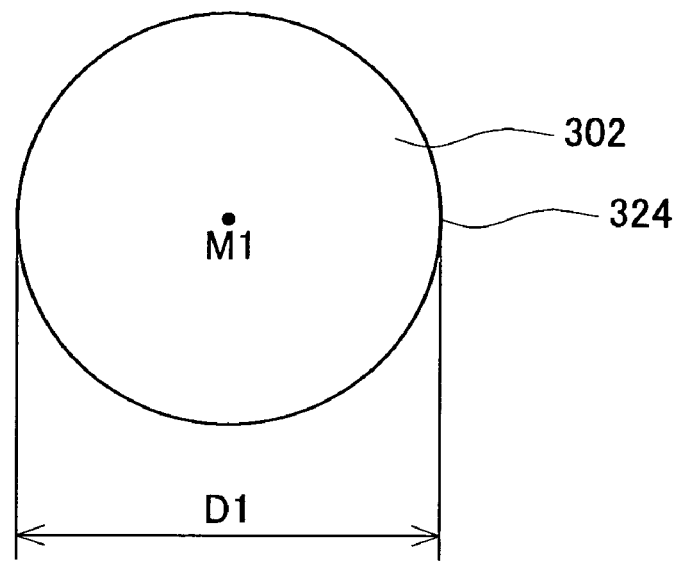
FIG. 11 shows a diagrammatic view in the direction of line XI-XI in FIG. 10.

As shown in FIG. 10 and FIG. 11, the bar-shaped section 302 of the first member 300 is of a circular bar shape having a circular cross-section perpendicular to the axis M1 (i.e. lateral cross-section). The lateral cross-section of the bar-shaped section 302 is uniform in the direction of the axis M1 and the diameter thereof is D1. Since the lateral cross-section of the bar-shaped section 302 is circular, then the diameter of the circumscribed circle which circumscribes the lateral cross-section of the bar-shaped section 302 and the diameter of the inscribed circle which inscribes the lateral cross-section of the bar-shaped section 302 are both D1.

Figure 12:
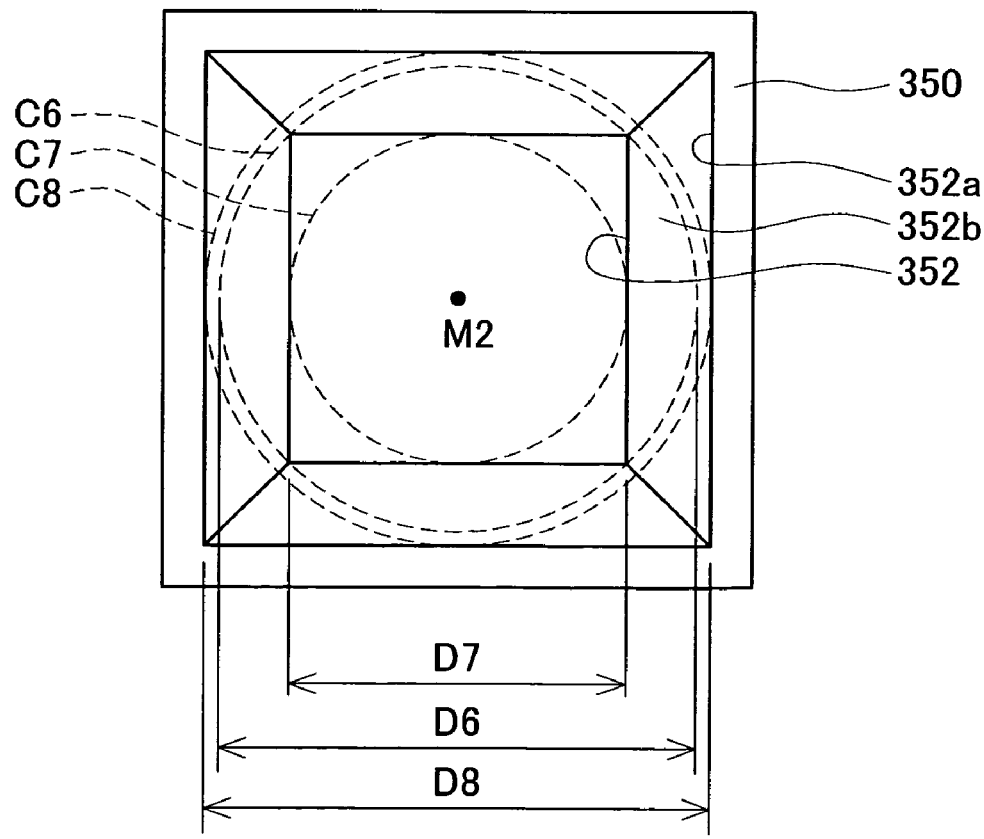
FIG. 12 shows a diagrammatic view in the direction of line XII-XII in FIG. 10.

As shown in FIG. 10 and FIG. 12, the hole 352 in the second member 350 has a square cross-section perpendicular to the axis M2 (i.e. lateral cross-section). A tapered section 352b is formed on one end 352a side of the hole 352. The size of cross-section of the tapered section 352b further increases nearer the one end 352a, and the side face of the hole 352 is inclined relative to the axis M2. D6 in FIG. 12 indicates the diameter of the circumscribed circle C6 which circumscribes the lateral cross-section of the hole 352. D7 in FIG. 12 indicates the diameter of the inscribed circle C7 which inscribes the lateral cross-section of the hole 352. D8 in FIG. 12 indicates the diameter of the inscribed circle C8 which inscribes the lateral cross-section of one end 352a of the hole 352.

The diameter D1 of the bar-shaped section 302 of the first member 300 is greater than the diameter D7 of the inscribed circle of the hole 352 of the second member 350, and is smaller than the diameter D6 of the circumscribed circle of the hole 352 of the second member 350. Furthermore, in the tapered section 352b of the hole 352, the lateral cross-section of the hole 352 expands in such a manner that the diameter D8 of the inscribed circle at one end 352a of the hole 352 is larger than the diameter D1 of the bar-shaped section 302 of the first member 300. In other words, in the tapered section 352b of the hole 352, the lateral cross-section of the hole 352 reduces in the pressure fitting direction of the bar-shaped section 302.

The side faces 324 of the bar-shaped section 302 of the first member 300 have a lower hardness than the side face of the hole 352 of the second member 350.

Figure 13:
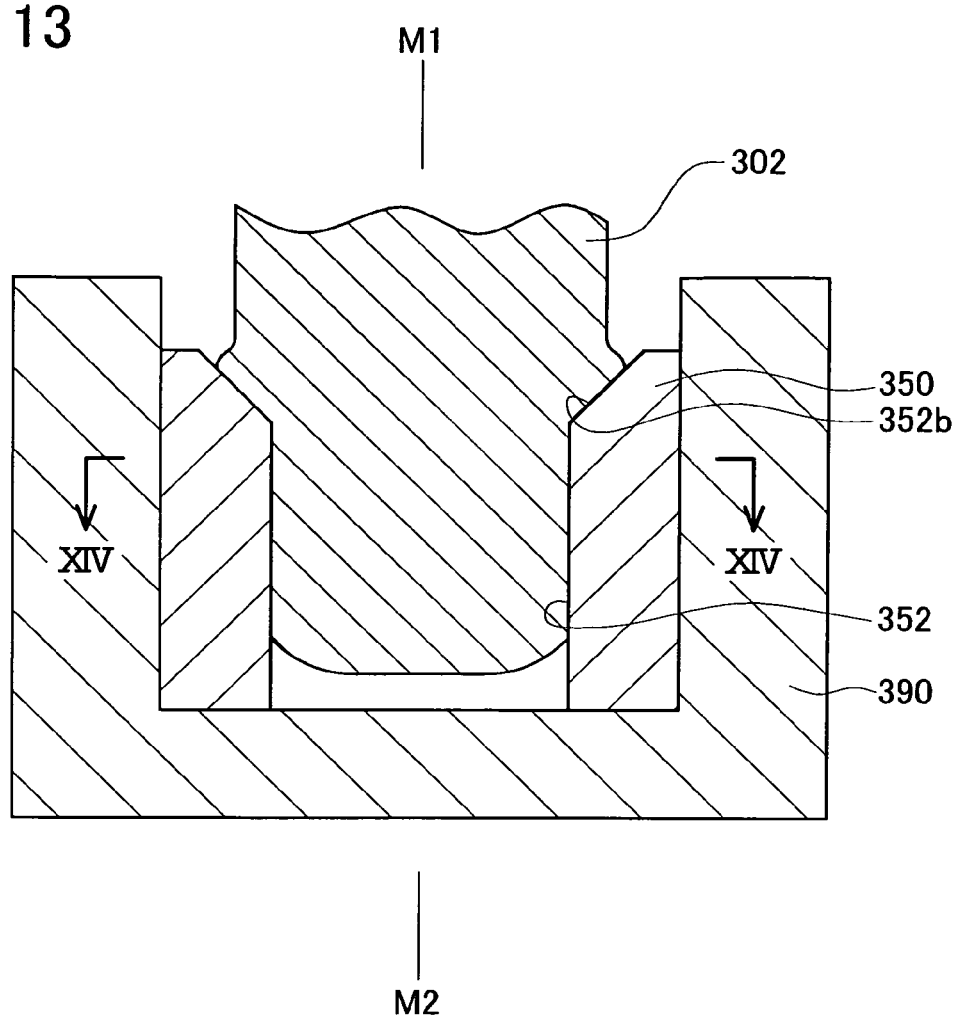
FIG. 13 shows a state where a bar-shaped section of a first member has been pressure fitted into a hole of a second member (third embodiment)
Figure 14:
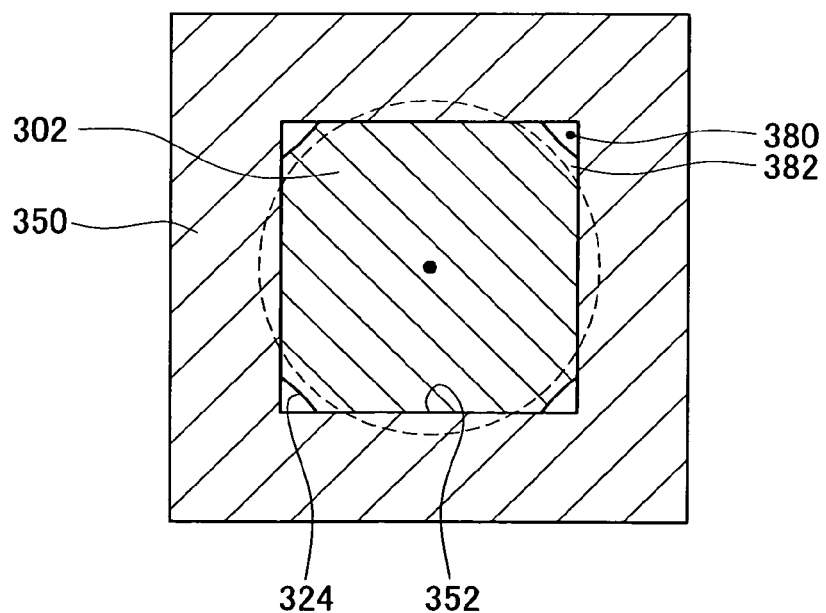
FIG. 14 is a cross-sectional view along line XIV-XIV in FIG. 13.

FIG. 13 and FIG. 14 show a state where the bar-shaped section 302 of the first member 300 has been pressure fitted into the hole 352 of the second member 350. As shown in FIG. 13, in this pressure fitting step, while the second member 350 is supported by a mold 390, or the like, the axis M1 of the bar-shaped section 302 and the axis M2 of the hole 352 are aligned, and the first member 300 and the second member 350 are brought towards each other along the axes M1 and M2. As stated previously, the diameter D1 of the bar-shaped section 302 is greater than the diameter D7 of the inscribed circle of the hole 352 and is smaller than the diameter D6 of the circumscribed circle of the hole 352. Consequently, as shown in FIG. 14, when the bar-shaped section 302 is pressure fitted into the hole 352, a portion of each side face 324 of the bar-shaped section 302 makes contact with the side face of the hole 352, while at the same time a portion of each side face 324 of the bar-shaped section 302 is separated from the side face of the hole 352 and forms gaps 380. Since the side faces 324 of the bar-shaped section 302 have a lower hardness than the side face of the hole 352, then the side faces 324 of the bar-shaped section 302 undergo a large plastic deformation. The side faces of the hole 352 also undergo plastic deformation, but to a lesser extent. Since the tapered section 352b in which the side faces are inclined is provided on one end 352a side of the hole 352, then the portion of the first member 300 which has deformed plastically does not flow to a great extent upwards, but does flow to a great extent inside the gaps 380 between the bar-shaped section 302 and the hole 352. The portion 382 which had flown plastically into the gaps 380 is processed and cured, thereby having its hardness improved. Due to the plastically deformed portion 382 of the first member 300 that had flown into the gaps 380, and been processed and cured during the process of plastic deformation, the first member 300 and the second member 350 are firmly fastened together.

The hole 352 in the second member 350 is not limited to having a square shaped lateral cross-section. The lateral cross-section of the hole 352 in the second member 350 may be formed respectively to a triangular shape, square shape, pentagonal shape, etc. In any case, the diameter D6 of the circumscribed circle of the lateral cross-section of the hole 352 should be made greater than the diameter D1 of the bar-shaped section 302, and furthermore the diameter D2 of the inscribed circle thereof should be made smaller than the diameter D1 of the bar-shaped section 302. By this configuration, it is possible to pressure fit the bar-shaped section 302 into the hole 352 in such a manner that a portion of each side face 324 of the bar-shaped section 302 interferes with the side faces of the hole 352, and a portion of each side face 324 of the bar-shaped section 302 is separated from the side faces of the hole 352 thereby forming gaps 380.

(Fourth Embodiment)

Figure 15:
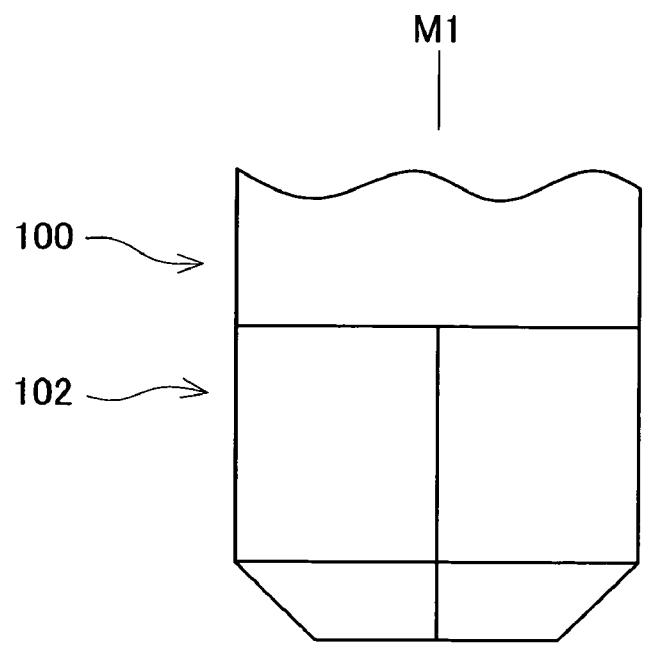
FIG. 15 shows a bar-shaped section of a first member, a hole of a second member, and an inserting member (fourth embodiment)
Figure 15:
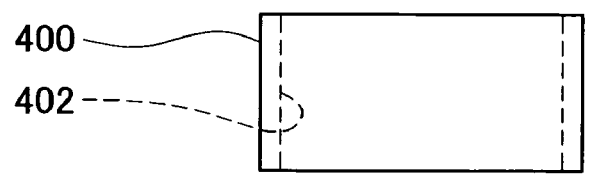
Figure 15:
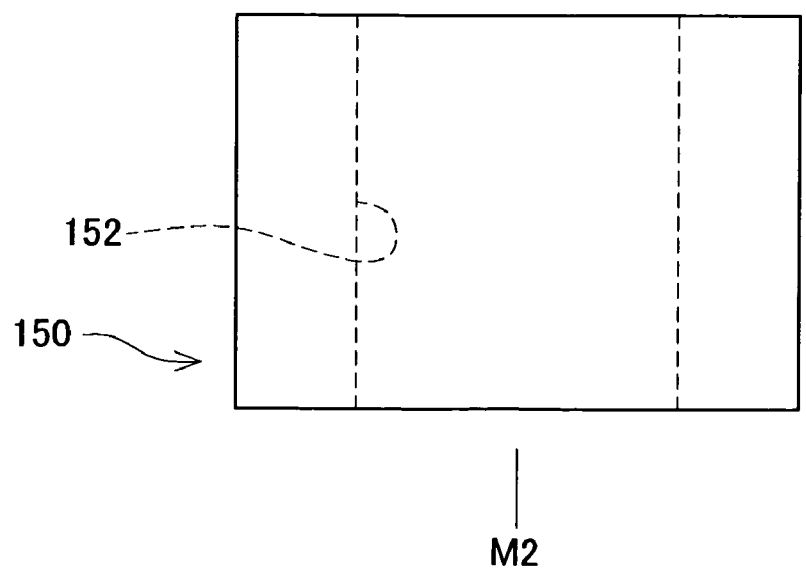

A fourth embodiment of the present invention is described below with reference to the drawings. In the present embodiment, technology for fastening together the first member 100 and the second member 150 shown in FIG. 15 is described. The first member 100 and the second member 150 are the respectively the same as in the first embodiment, but the present embodiment differs in that an inserting member 400 is interposed therebetween. The inserting member 400 is a ring-shaped member having an internal hole 402. The inserting member 400 may be metallic or non-metallic. Desirably, the inserting member 400 has a lower hardness than the first member 100 and the second member 150.

Figure 16:
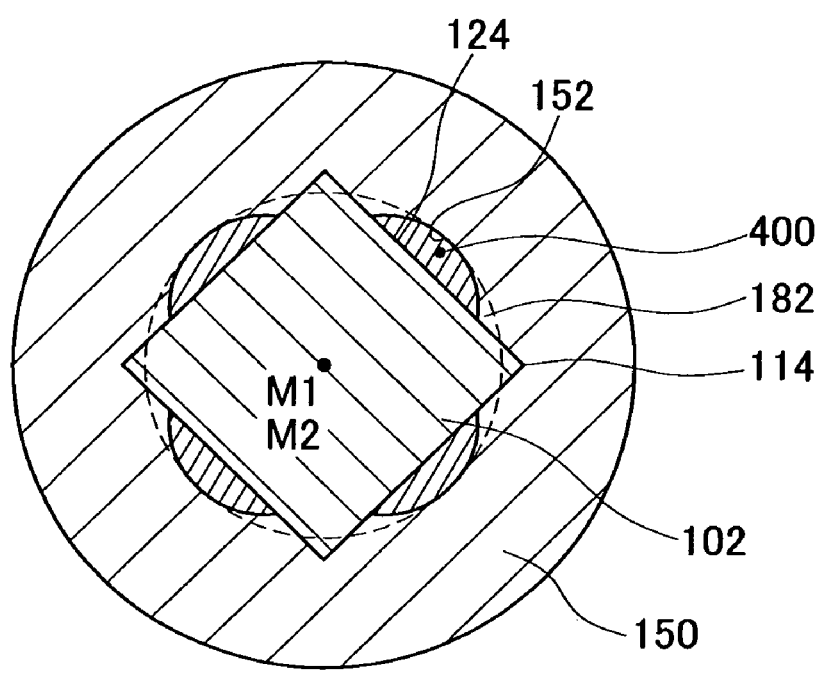
FIG. 16 is a cross-sectional diagram showing a state where a bar-shaped section of a first member has been pressure fitted into a hole of a second member (fourth embodiment)

FIG. 16 shows a state in which the bar-shaped section 102 of the first member 100 has been pressure fitted into the hole 252 of the second member 250. As shown in FIG. 16, a portion (and more specifically, in the vicinity of the respective peak 114) of each side face 124 of the bar-shaped section 102 carves into a side face of the hole 252; and furthermore other portion of each side face 124 of the bar-shaped section 102 is separated from the side faces of the hole 252. The inserted member 400 is filled into the gaps between the side faces 124 of the bar-shaped section 102 and the side faces of the hole 252. By this configuration, the first member 100 and the second member 150 are firmly fastened together at an even stronger degree.

(Fifth Embodiment)

Firstly, the principal characteristic features of the fifth embodiment described below will be stated.

Figure 21:
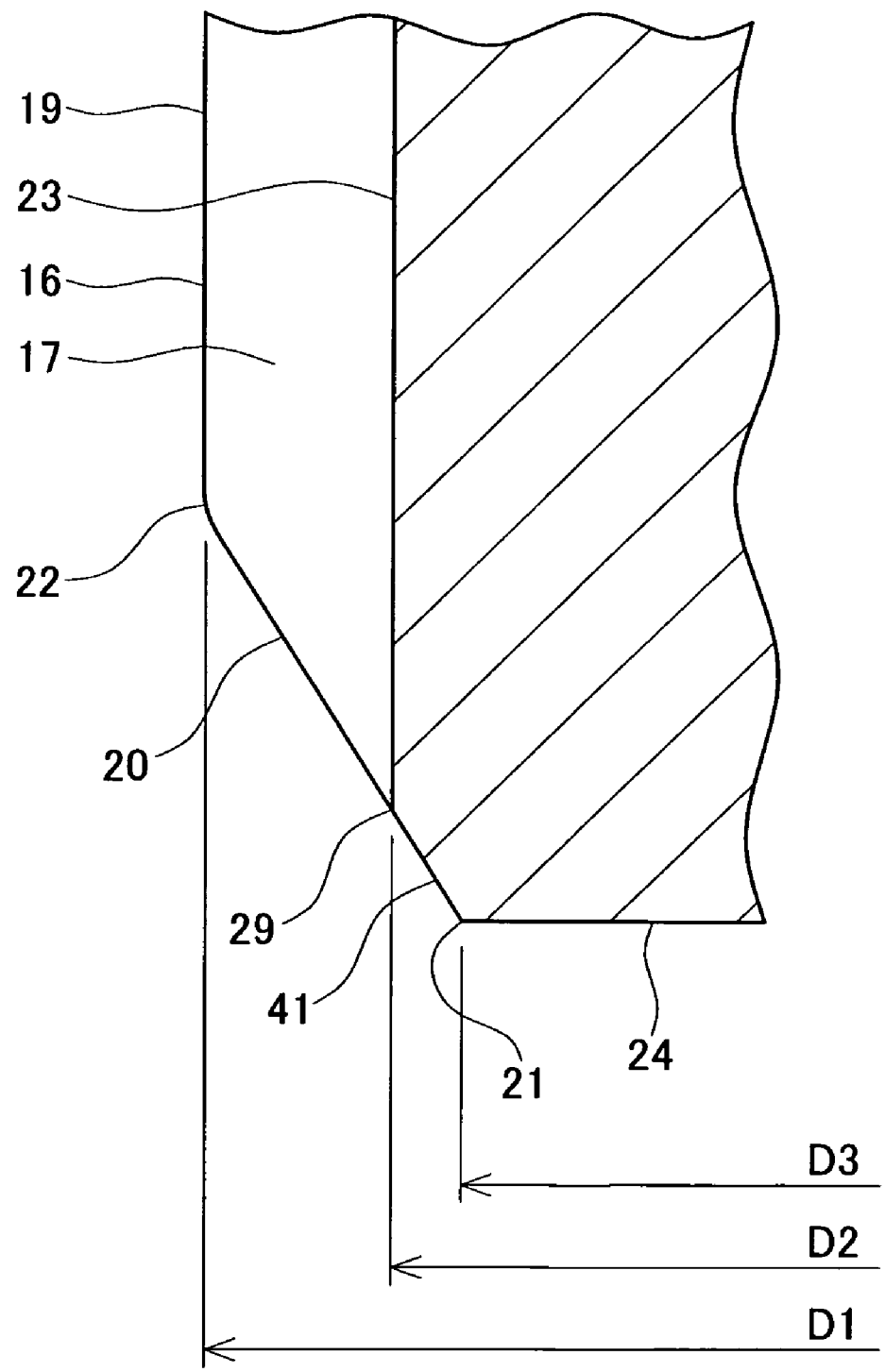
FIG. 21 is a cross-sectional view along line XXI-XXI in FIG. 19.

(Characteristic feature 1) A group of projections 16 which extend in the direction of the axis 18 and repeat in the circumferential direction are formed on the lower end side of the bar-shaped member 12. The projections 16 each comprise a uniform height portion 19 in which the height of the peak is uniform, and a varied height section 20 in which the height of the peak gradually changes at uniform degrees in the upward direction (FIG. 21).

(Characteristic feature 2) A pair of first abutting faces 25 which extend in the axial direction and the circumferential direction are formed on the bar-shaped member 12. One first abutting face 25 and the other first abutting face 25 are disposed at symmetrical positions on either side of the axis 18 of the bar-shaped member 12. Moreover, a pair of second abutting faces 26 which are displaced at a phase by 90 degrees with respect to the first abutting face 25 and which extend in the axial direction and the circumferential direction are formed on the bar-shaped member 12.

(Characteristic feature 3) The bar-shaped member 12 is made from a material having greater hardness than the tubular member 14.

(Characteristic feature 4) The tubular member is set in a circular recess of a molding jig.

(Characteristic feature 5) When fastening the bar-shaped member 12 and the tubular member 14 together, the bar-shaped member 12 is lowered down towards the tubular member 14. Since the bar-shaped member 12 comprises the varied height section 20 on the projections 16 and a tapered surface 41, then the portion of the tubular member 14 which has deformed plastically does not greatly flow downwards in the course of insertion, but rather flows and enters into the inside of the grooves 17 between the projections 16. Due to the plastic deformation of the tubular member 14 and the projections 16 of the bar-shaped member 12, both of the deformed portions undergo processing and curing. The bar-shaped member 12 and the tubular member 14 are fastened together strongly due to the fact that the plastically deformed portions of the tubular member 14 enters tightly and deeply inside the respective grooves 17 of the bar-shaped member 12 and due to the processing and curing which accompany this plastic deformation.

A fifth embodiment of the present invention is described below with reference to the drawings. In the present embodiment, the bar-shaped member 12 shown in FIG. 17 and the tubular member 14 shown in FIG. 18 are fastened together by pressure fitting. Below, the upper and lower directions in FIG. 17 are determined to correspond to the upper and lower directions of the bar-shaped member 12 and tubular member 14.

Figure 17:
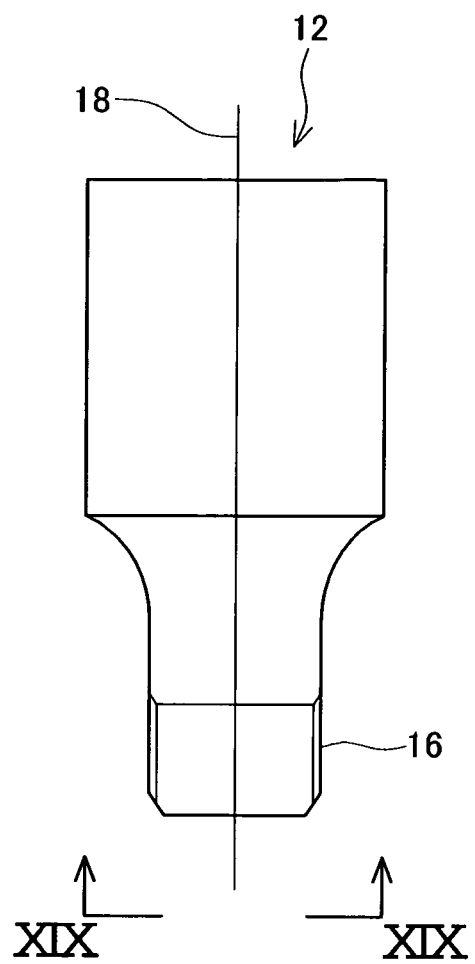
FIG. 17 is a side view diagram of a bar-shaped member (fifth embodiment)
Figure 18:
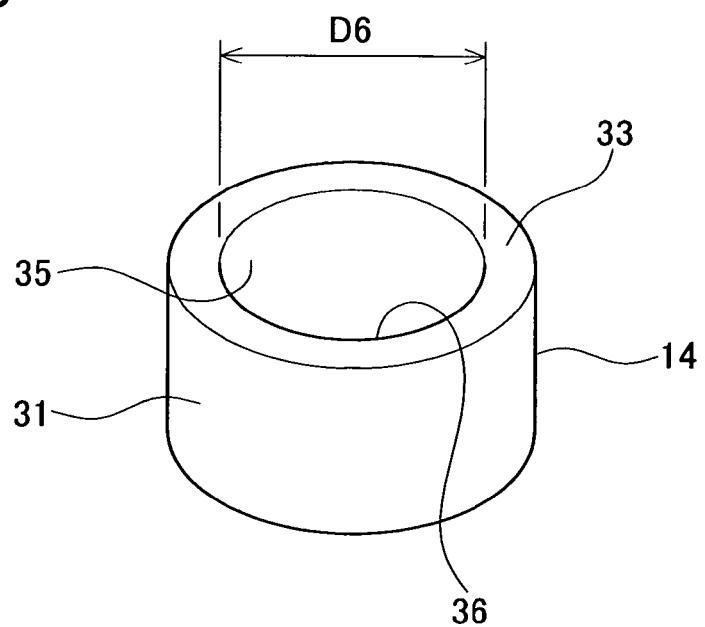
FIG. 18 shows a diagrammatic view of a bar-shaped member (fifth embodiment)
Figure 19:
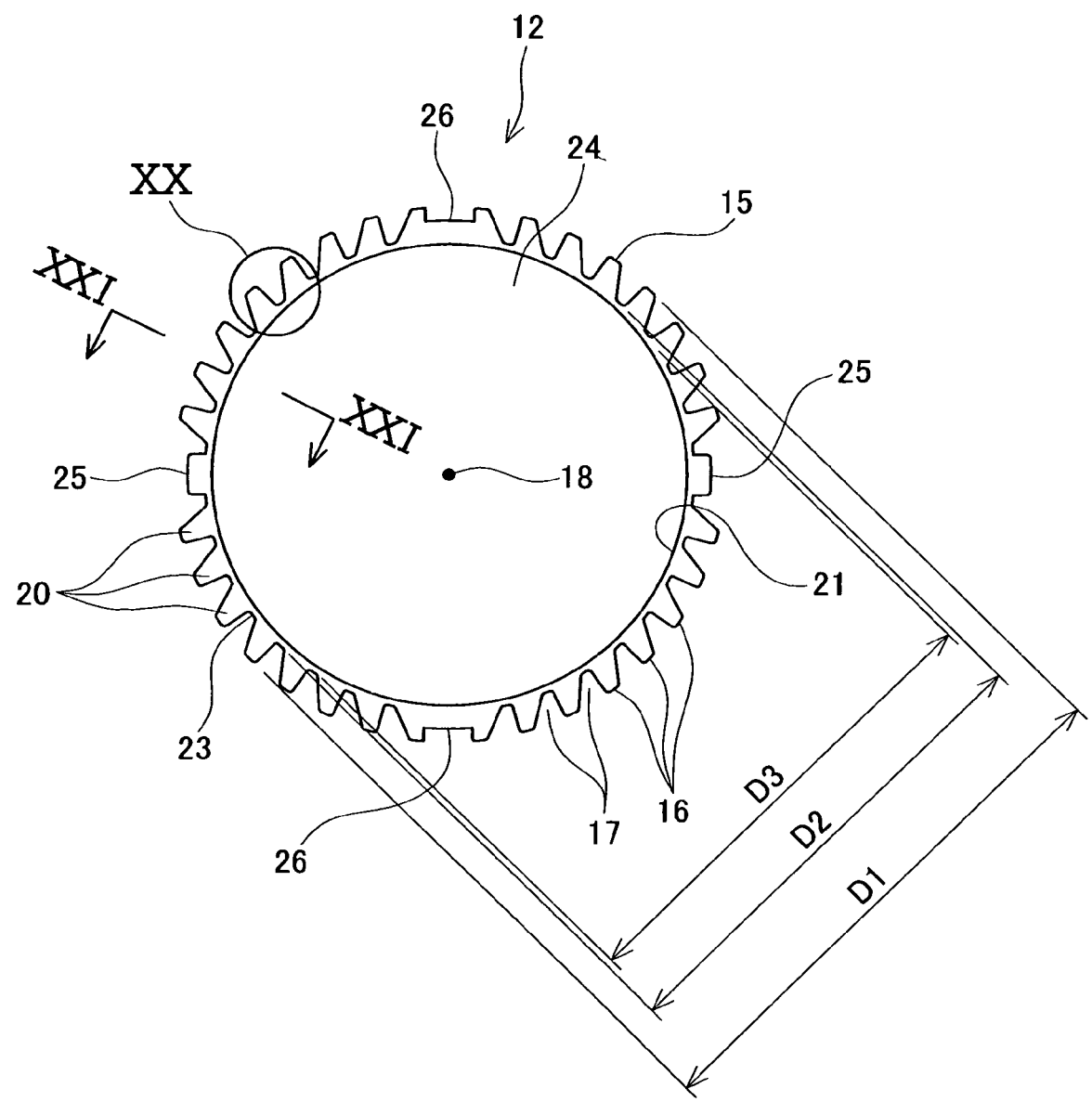
FIG. 19 shows a diagrammatic view in the direction of line XIV-XIV in FIG. 17.

As shown in FIG. 17 and FIG. 19, a group of projections 16 (serrations) which extend in the direction of the axis 18 and repeat in the circumferential direction are formed on the lower end side of the bar-shaped member 12. As FIG. 19 clearly shows, each of the grooves 17 is formed between the respective adjacent projections 16. As shown in FIG. 21, each projection 16 comprises a portion 19 in which the height of the peak is uniform and (unchanging) (hereinafter called "uniform height section 19") and a portion 20 (hereinafter, called "varied height section 20") in which the height of the peak increases (changes) uniformly toward the upper side. A radius (rounded shape) is applied to the upper end portion 22 of the varied height section 20; in other words, the portion where the varied height section 20 merges with the uniform height section 19.

Below the projections 16, a taper-shaped section 41 (called "tapered face 41" below) is provided, which has a circular cross-section and the radius of which increases uniformly in the upward direction. The varied height sections 20 of the projections 16 join to the tapered face 41 by means of the height becoming zero at the end 29 of each projection 16. The tapered face 41 joins to the front end face 24 which is formed on the front end. In the tapered face 41 and the varied height section 20 of the projections in the bar-shaped member 12, the lateral cross-section reduces uniformly in the pressure fitting direction of the bar-shaped member 12.

The shape of the side face of the varied height section 20 of the projection 16 and the tapered face 41 is a straight line in FIG. 21, but the shape is not limited to this. For example, the side face of the varied height section 20 and the tapered face 41 may have a curved shape. The upper end section 22 of the varied height section 20 of the projections 16 should continue smoothly from the uniform height section 19, but does not necessarily have to be formed with a radius shape.

Figure 20:
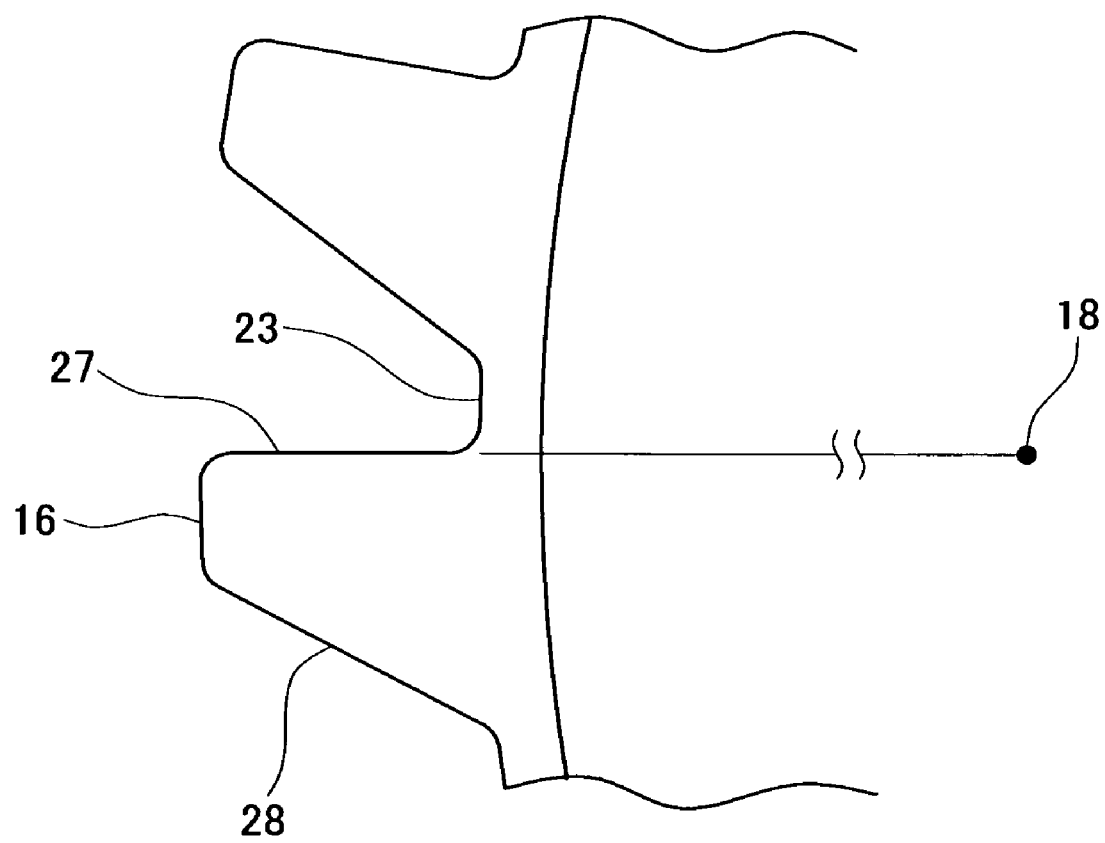
FIG. 20 is a detailed diagram of portion XX in FIG. 19.

As shown in FIG. 20, one side face 27 of each projection 16 coincides with the diametrical direction. The other side face 28 of each projection 16 is inclined with respect to the side face 27.

As shown in FIG. 19, a pair of first abutting faces (walls) 25 which extend in the axial direction 18 are formed on the bar-shaped member 12. The one first abutting face 25 and the other first abutting face 25 are disposed at symmetrical positions on either side of the axis 18 of the bar-shaped member 12. Supposing that the surface of the first abutting face 25 composes a part of an imaginary round bar having a center on the axis 18 of the bar-shaped member 12, then the surface of the first abutting face 25 coincides with the outer circumferential surface thereof. Moreover, similarly disposed second abutting faces 26 which have the same shape as the first abutting face 25 are formed on the bar-shaped member 12. The first abutting faces 25 and the second abutting faces 26 are displaced by 90 degrees in phase.

The diameter D1 of the circumscribed circle which circumscribes the cross-section perpendicular to the axis 18 of the bar-shaped member 12 (hereinafter, simply called the outer diameter D1) is designed to be of a diameter which is greater than the inner diameter D6 of the tubular member 14 (see FIG. 18). The diameter D3 of the front end face 24 of the bar-shaped member 12 is designed to be of a dimension smaller than the inner diameter D6 of the tubular member 14. The diameter of the inscribed circle which inscribes the cross-section perpendicular to the axis 18 of the bar-shaped member 12, in other words, the diameter of the circle which includes the bottom faces 23 of each of the grooves 17 of the bar-shaped member 12 (called the "bottom face diameter D2" below), is designed to be of a dimension greater than the inner diameter D6 of the tubular member 14. The bottom face diameter D2 can also be designed to be of a dimension smaller than the inner diameter D6 of the tubular member 14.

The bar-shaped member 12 is a cast component and is made from a material having greater hardness than the tubular member 14. It is also possible to carry out high-frequency quenching or the like, of the projections 16 of the bar-shaped member 12 and the base portion of the projections 16, so as to improve the hardness of the projections 16 and the base portion thereof above that of the tubular member 14. The bar-shaped member 12 and the tubular member can, for example, be made of steel, aluminum, copper, or the like.

Figure 22:
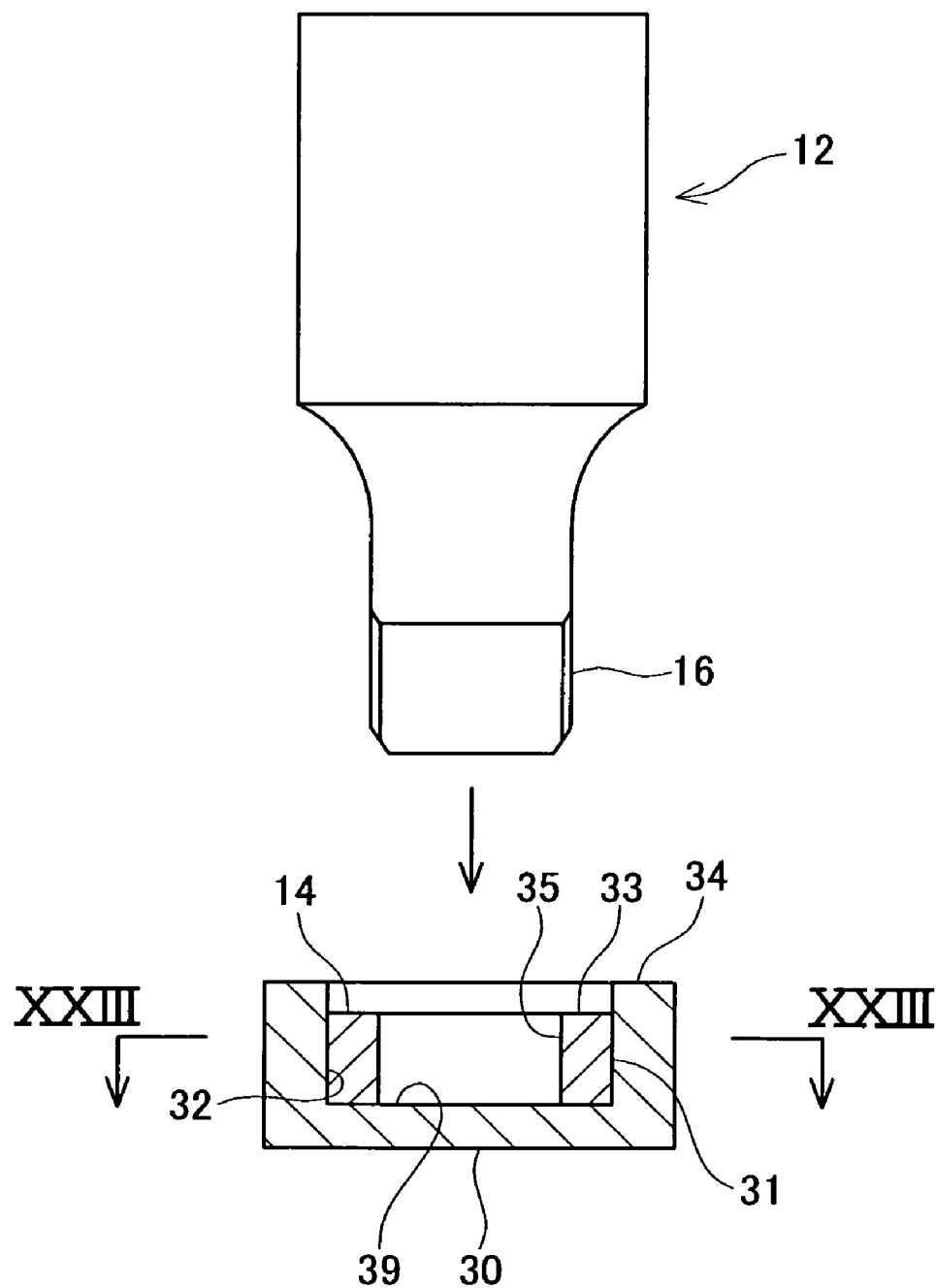
FIG. 22 shows a state where a bar-shaped member is disposed above a tubular member set in a molding jig.
Figure 23:
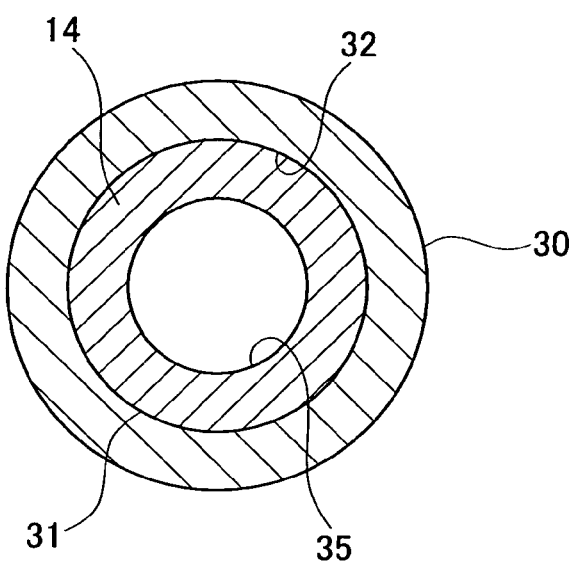
FIG. 23 is a cross-sectional view along line XXIII-XXIII in FIG. 22.

To prepare for the fastening of the bar-shaped member 12 and the tubular member 14, the tubular member 14 is set in a circular recess 39 of a molding jig (die) 30 as shown in FIG. 22 and FIG. 23. The upper surface 33 of the tubular member 14 is disposed at a lower position than the upper surface 34 of the molding jig 30. The tubular member 14 is set in the molding jig 30 in a state where virtually no gap is formed between the outer circumferential surface 31 of the tubular member 14 and the inner circumferential surface 32 of the molding jig 30. The molding jig 30 is fixed to a supporting platform (not illustrated).

Figure 24:
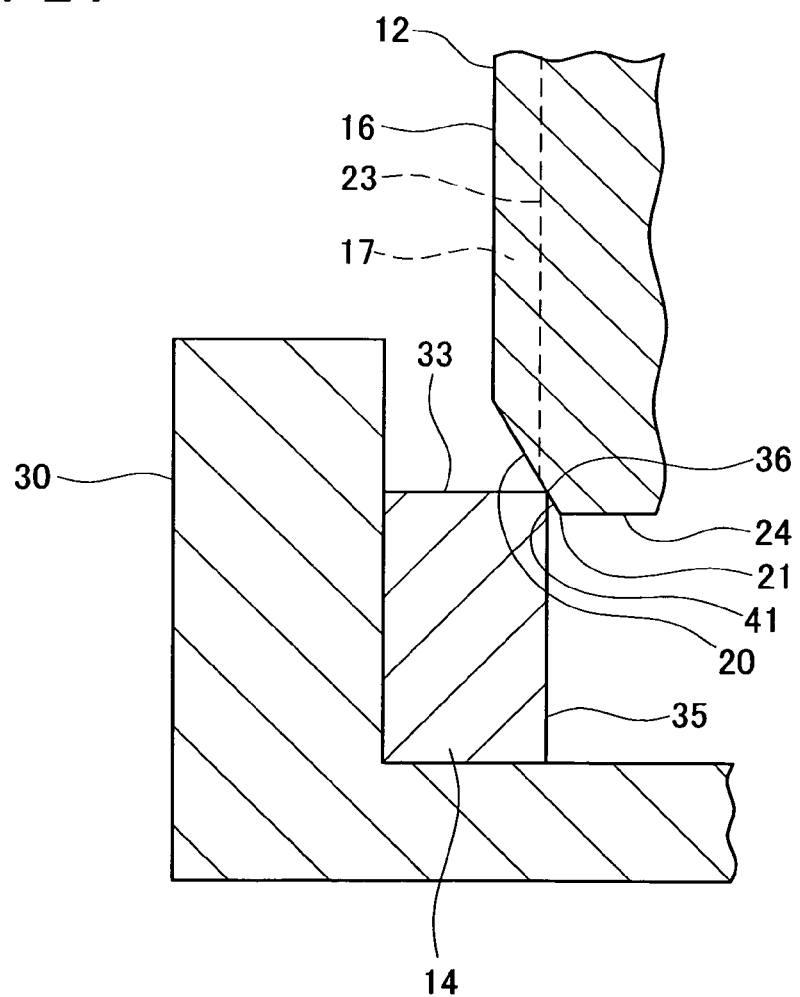
FIG. 24 is a cross-sectional diagram showing a state where the bar-shaped member that has been lowered has made contact with the tubular member.

As shown in FIG. 22, the bar-shaped member 12 is disposed in a state where it is held by an elevator mechanism (not illustrated) above the tubular member 14 which has been set in the molding jig 30. When the bar-shaped member 12 and the tubular member 14 are fastened together, the bar-shaped member 12 is moved downwards. As stated above, the diameter D3 of the front end face 24 of the bar-shaped member 12 is designed to be of a dimension smaller than the inner diameter D6 of the tubular member 14. Consequently, when the bar-shaped member 12 is moved downwards, then as shown in FIG. 24, the tapered face 41 of the bar-shaped member 12 makes contact with the upper edge 36 of the inner circumference of the tubular member 14. Furthermore, the bottom face diameter D2 of the grooves 17 is designed to be of a dimension greater than the inner diameter D6 of the tubular member 14. Therefore, when the bar-shaped member 12 is moved downwards and the tapered surface 41 makes contact with the upper edge 36 of the inner circumference of the tubular member 30, in terms of the positional relationships in the horizontal direction, the inner circumferential surface 35 of the tubular member 14 is disposed to the inner side (axial side) of the bottom faces 23 of the grooves 17.

Figure 25:
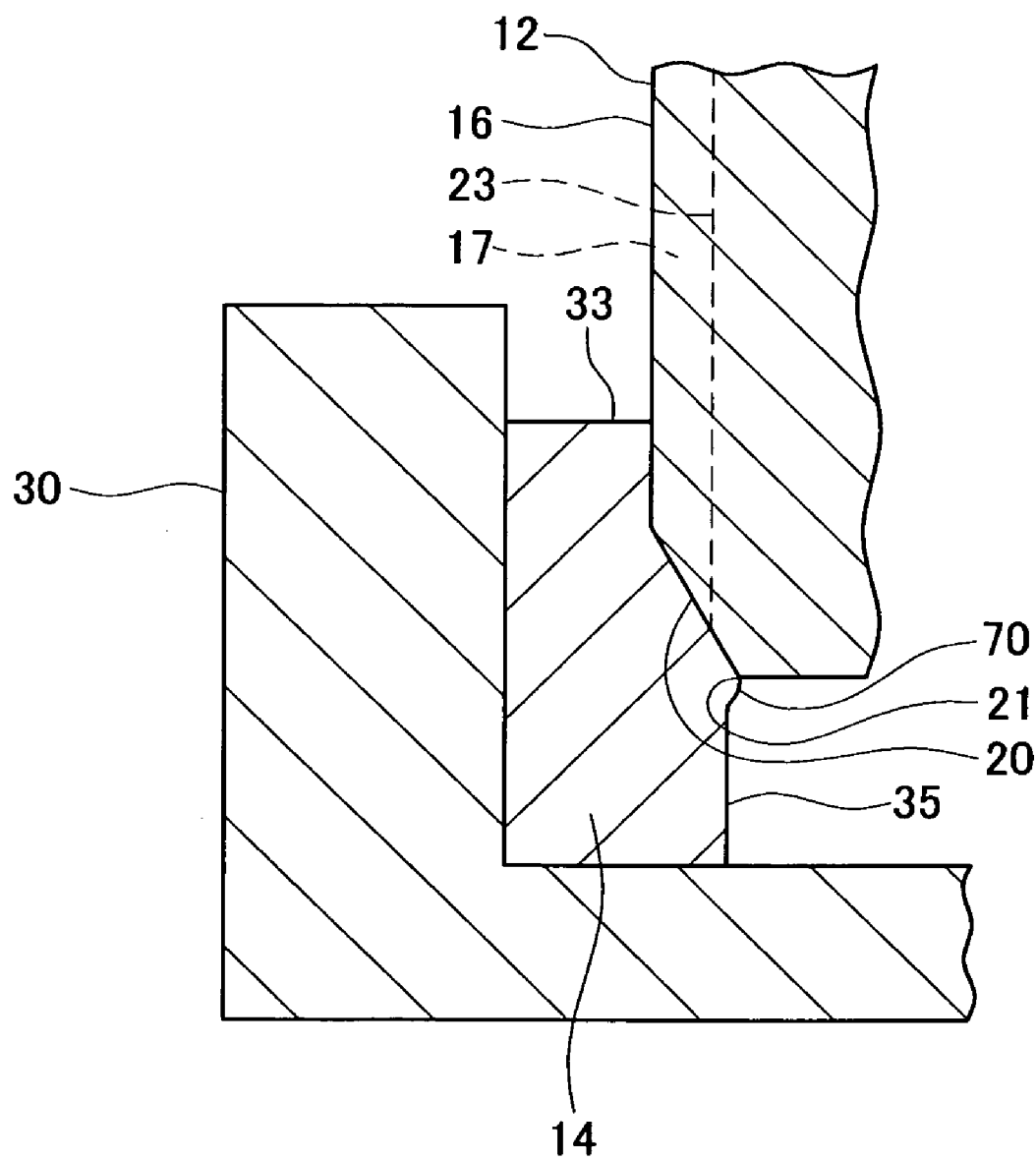
FIG. 25 is a cross-sectional diagram showing a state during the pressure fitting of the bar-shaped member into the tubular member.

FIG. 25 shows a state where the bar-shaped section 12 has been moved further downwards. Since the peaks of the projections 16 of the bar-shaped member 12 are shorter on the upper side than on the lower side, and furthermore the bar-shaped member 12 has greater hardness than the tubular member 14, the projections 16 descend so as to carve into the tubular member 14 while causing the tubular member 14 to undergo plastic deformation. In this case, the projections 16 also undergo plastic deformation, but to a lesser extent than the tubular member 14. Since the varied height section 20 and the tapered face 41 in which the side faces have an inclined shape are provided in the bar-shaped member 12, the portion of the tubular member 14 which undergoes plastic deformation does not flow downwards to a great extent, but pliably flows and enters into the grooves 17. Since the tubular member 14 flows downwards to some degree, a portion 70 which has deformed plastically in a bulging shape is formed on the tubular member 14 (this portion 70 which has deformed plastically in a bulging shape is omitted from the drawings described below).

Figure 26:
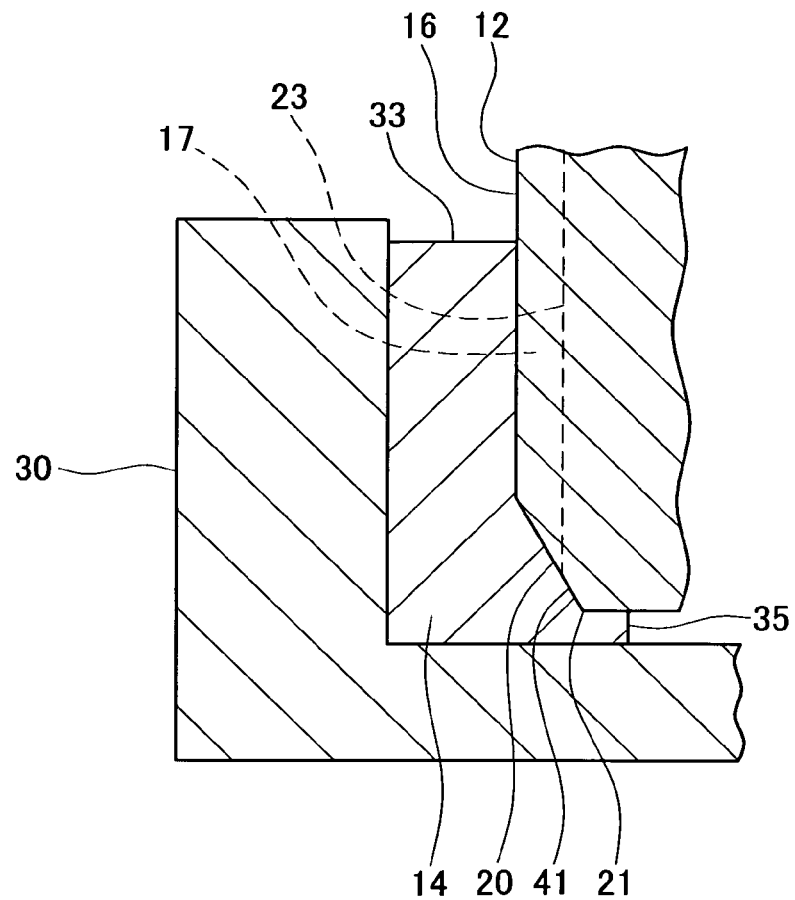
FIG. 26 is a cross-sectional diagram showing a state where the bar-shaped member has been pressure fitted into the tubular member.
Figure 27:
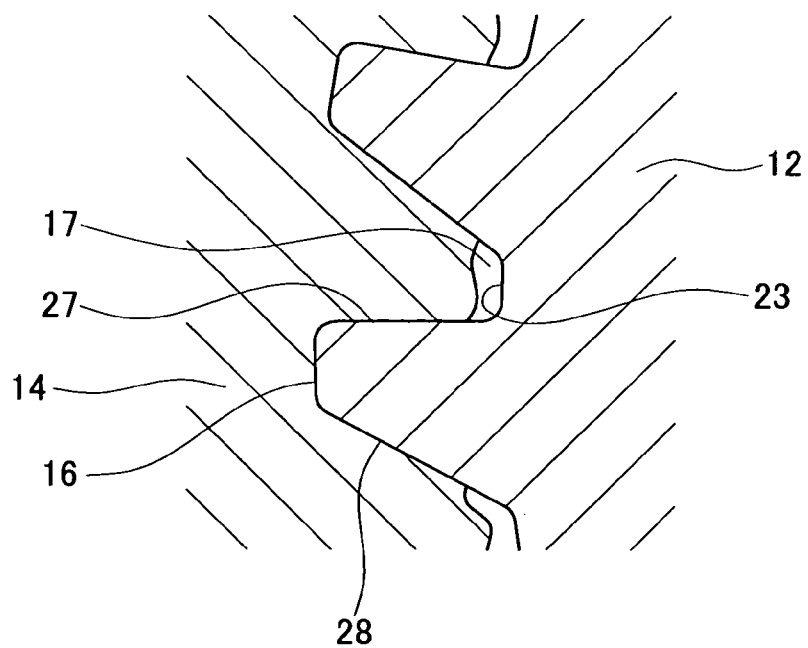
FIG. 27 is a cross-sectional diagram showing a state where the material of the tubular member has entered into the grooves between the projections of the bar-shaped member.

FIG. 26 shows a state where the bar-shaped member 12 has reached the lowermost position and has thereby halted progressing. Since the projections 16 of the bar-shaped member 12 cause the tubular member 14 to deform plastically and the tubular member 14 is set in a molding jig 30 and cannot deform toward the outer side, then the upper face 33 of the tubular member 14 is disposed at a higher position than before undergoing deformation. Furthermore, the inner circumferential surface 35 of the tubular member 14 is disposed further toward the inner side than before undergoing deformation. As shown in FIG. 27, the plastically deformed portion of the tubular member 14 enters sufficiently into the grooves 17 of the bar-shaped member 12. Furthermore, both of the deformed portions are processed and cured due to the plastic deformation of the projections 16 of the bar-shaped member 12 and the vicinity of the portion of the tubular member 14 into which the projections 16 have engraved. Therefore, the hardness of the plastically deformed portion is strengthened. Consequently, the bar-shaped member 12 and the tubular member 14 are fastened together strongly due to the fact that the plastically deformed portion of the tubular member 14 enters sufficiently inside the grooves 17 of the bar-shaped member 12 and due to the processing and curing which accompany this plastic deformation.

On the other hand, if a varied height section 20 and a tapered face 41 are not provided on the bar-shaped member 12, then a larger amount of the inner circumferential portion of the tubular member 14 is pushed and removed directly downwards compared to a case where they are provided. Therefore, the amount of the plastically deformed portion of the tubular member 14 entering into the grooves 17 becomes lower. Of course, even of a tapered face 41 is not provided, since the plastically deformed portion of the tubular member 14 enters into the grooves 17, then the bar-shaped member 12 and the tubular member 14 are fastened together reliably.

As described previously, one side face 27 of each of the projections 16 coincides with the diametrical direction and the other side face 28 of each projection 16 is inclined with respect to the one side face 27. Therefore, the fastening strength of the bar-shaped member 12 and the tubular member 14 in respect of axial rotation varies depending on the direction of action of the torque. For example, in FIG. 27, when the tubular member 14 is fixed, then a greater fastening strength is obtained if a torque were applied to the bar-shaped member 12 in the clockwise direction than if a torque were applied to the bar-shaped member 12 in the counter-clockwise direction. This is because the other side faces 28 of the projections 16 are inclined with respect to the diametrical direction, and therefore slippage between the bar-shaped member 12 and the tubular member 14 is more liable to occur when a torque is applied to the bar-shaped member 12 in the counter-clockwise direction.

As described above, when the bar-shaped member 12 is moved downwards and the tapered face 41 makes contact with the upper edge 36 of the inner circumference of the tubular member 14, then the inner circumferential surface 35 of the tubular member 14 is disposed to the inner side of the bottom faces 23 of the grooves 17. The diameter D3 of the front end face 24 of the bar-shaped member 12 and the bottom face diameter D2 of the bottom faces 23 are determined in such a manner that this relationship is guaranteed even if there is variation in the inner diameter D6 of the tubular member 12. Consequently, even if there is variation in the internal diameter D6 of the tubular member 14, when the bar-shaped member 12 makes contact with the upper edge 36 of the inner circumference of the tubular member 14, then in the positional relationships in the horizontal direction, no gap occurs between the inner circumferential surface 35 of the tubular member 14 and the bottom faces 23 of the grooves 17. If no gaps occur between the inner circumferential surface 35 of the tubular member 14 and the bottom faces 23 of the grooves 17, then when the bar-shaped member 12 is moved further downwards and the tubular member 14 has deformed, the plastically deformed portion enters sufficiently into the grooves 17.

The distance between one first abutting face 25 and the other first abutting face 25 of the bar-shaped member 12, and the distance between one second abutting face 26 and the other second abutting face 26 are determined so as to be slightly larger than the internal diameter D6, even if there is variation in the internal diameter D6 of the tubular member 14. Therefore, when the bar-shaped member 12 is moved downwards and the projections 16 carve into the tubular member 14, the first abutting faces 25 and the second abutting faces 26 abut face-to-face respectively with the inner circumferential surface 35 of the tubular member 14. Since the first abutting faces 25 and the second abutting faces 26 merely abut with the surface of their counterpart, they do not carve into the tubular member 14 as the projections 16 do. Therefore, the bar-shaped member 12 and the tubular member 14 are mutually guided by the first abutting faces 25 and the second abutting faces 26, and hence their respective axes coincide accurately with each other.

As stated above, a curved radius is provided on the upper end portion 22 of the varied height section 20 of the projections 16. Therefore, it is possible to restrict sudden decline in the force pushing the bar-shaped member 12 downwards, when the bar-shaped member 12 is moved downward and the members transfer from a state where the varied height sections 20 of the projections 16 are in contact with the tubular member 14 to a state where additionally the uniform height sections 19 of the projections 16 are in contact with the tubular member 14.

Therefore, the speed of the downward movement of the bar-shaped member 12 can be controlled easily. It is also possible to determine change in the force which causes the bar-shaped member 12 to descend and to maintain a position of descent of the bar-shaped member 12 from this change. By adopting this composition, it is possible to achieve a more accurate fastening operation than if the pressure fitting process is controlled on the basis of the distance of movement of the bar-shaped member 12.

The phase difference between the pair of first abutting faces 25 and the pair of second abutting faces 26 is not limited to 90 degrees. Even if the phase difference is an angle other than 90 degrees, the abutting faces 25 and 26 are able to ensure that the axis of the bar-shaped member 12 and the axis of the tubular member 14 coincide accurately with each other. The surfaces such as the first abutting faces 25 and the second abutting faces 26 can also be provided in five or more positions. By providing a plurality of abutting faces and arranging their positions in such a manner that the vector sum of the forces acting on the abutting faces is zero during the pressure fitting process, then it is possible to make the axis of the bar-shaped member 12 and the axis of the tubular member 14 coincide accurately with each other.

Figure 28:
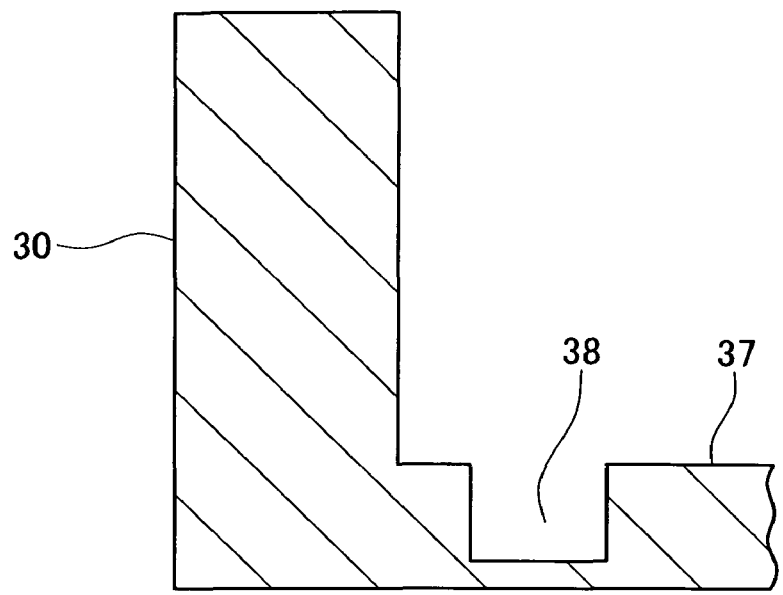
FIG. 28 is a cross-sectional diagram of a molding jig (in a state where bottom grooves are provided)
Figure 29:
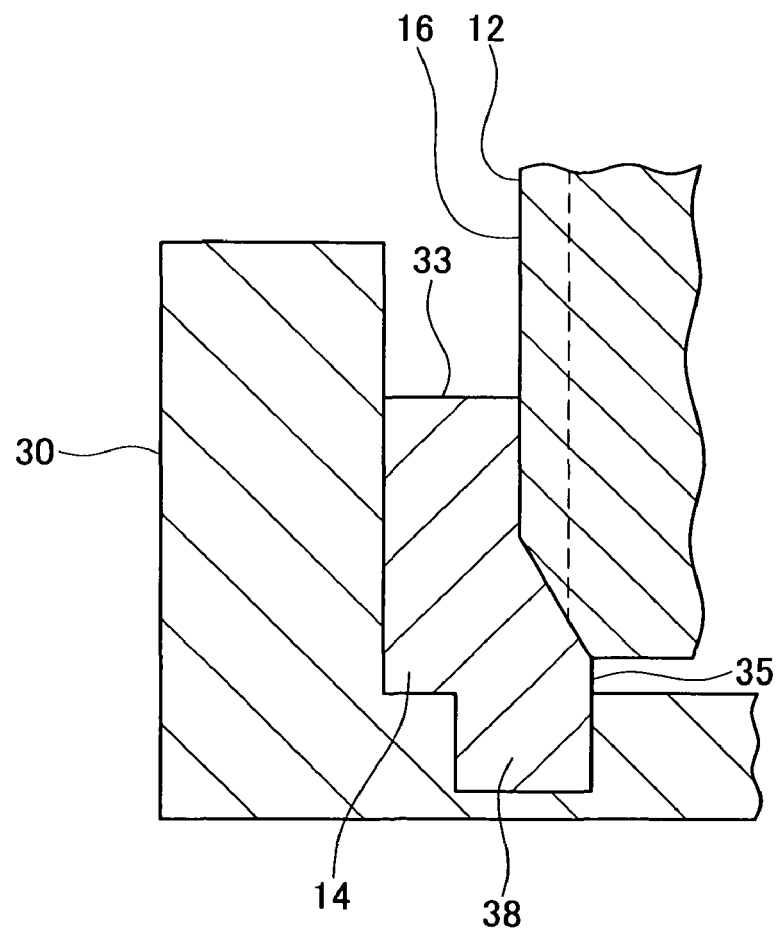
FIG. 29 is a cross-sectional diagram of a state where plastically flowed material of the tubular material has flowed into the bottom grooves of the molding jig.

As shown in FIG. 28, it is also possible to form a base section groove 38 passing through the whole circumference, in the vicinity of the outer circumferential portion of the base section 37 of the molding jig 30. If a base section groove 38 of this kind is formed, then as shown in FIG. 29, a part of the plastically deformed portion of the tubular member 14 flows and enters into the base section groove 38. It is possible to adjust the amount of plastically deformed material and the range of plastic deformation, by determining the depth, width, cross-sectional shape and position of the base section groove 38 appropriately. If the amount of plastic deformation and the range of plastic deformation have been adjusted, then the hardness and the range of processing and curing can be determined and the fastening force is stabilized. A molding jig 30 of this type can also be used for embodiments 1 to 4 described above.

Figure 30:
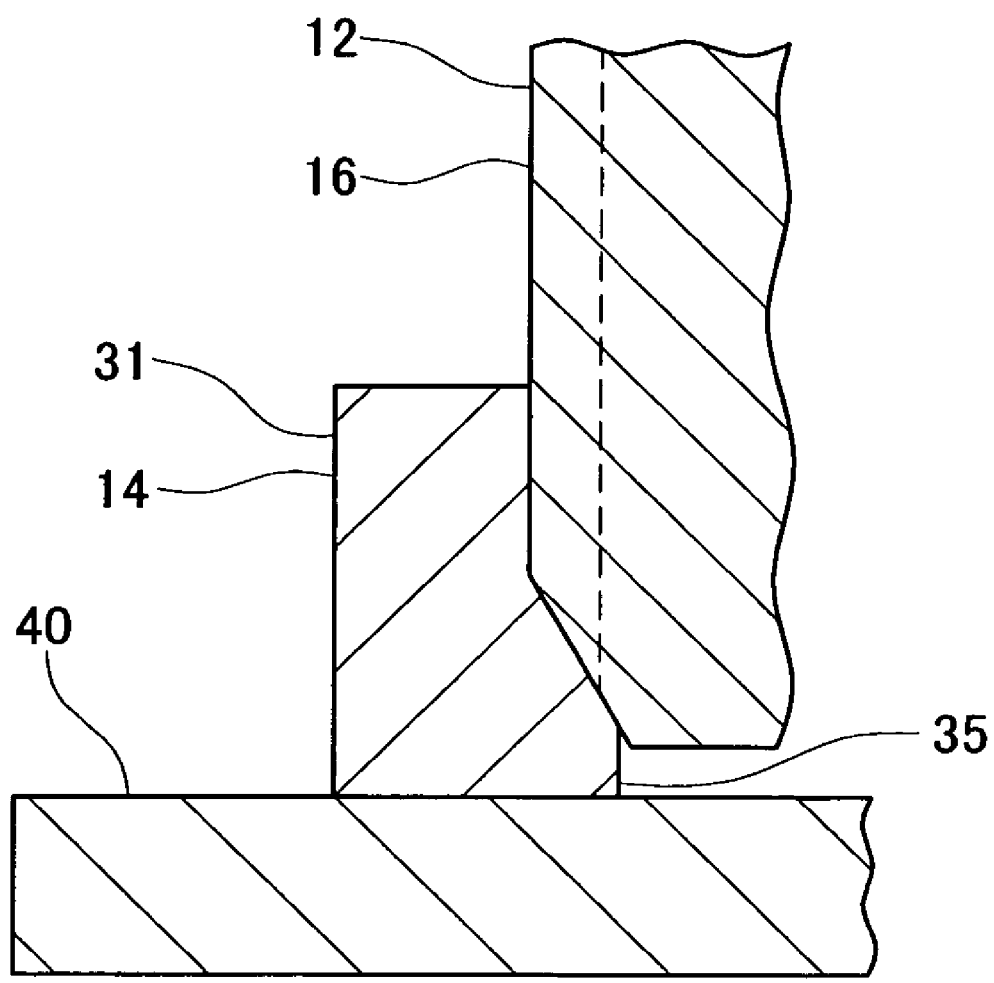
FIG. 30 is a cross-sectional diagram of a case where pressure fitting is carried out without restricting the outward movement of the outer circumference portion of a tubular member.

As shown in FIG. 30, it is also possible to fasten the bar-shaped member 12 and the tubular member 14 together without using a molding jig 30. In this case, the tubular member 14 is previously registered in position on a supporting platform 40. Even when a molding jig 30 is not used, if the material thickness of the tubular member 14 (i.e. the distance between the outer circumferential surface 31 and the inner circumferential surface 35) is great or if the hardness of the tubular member 14 is significantly lower than the hardness of the bar-shaped member 12, then it is possible to cause the plastically deformed portion of the tubular member 14 to enter sufficiently into the grooves 17 of the bar-shaped member 12.

The bar-shaped member 12 is not limited to a round bar shape, and may also have a square bar shape. The tubular member 14 does not have to be a round tubular shape. For example, the inner circumferential surface of the tubular member 14 may also have a polygonal shape.

The present inventors fastened together a tubular member 14 and a bar-shaped member 12 under various conditions and measured their respective hardness. The results of this measurement are described below.

Figure 31:
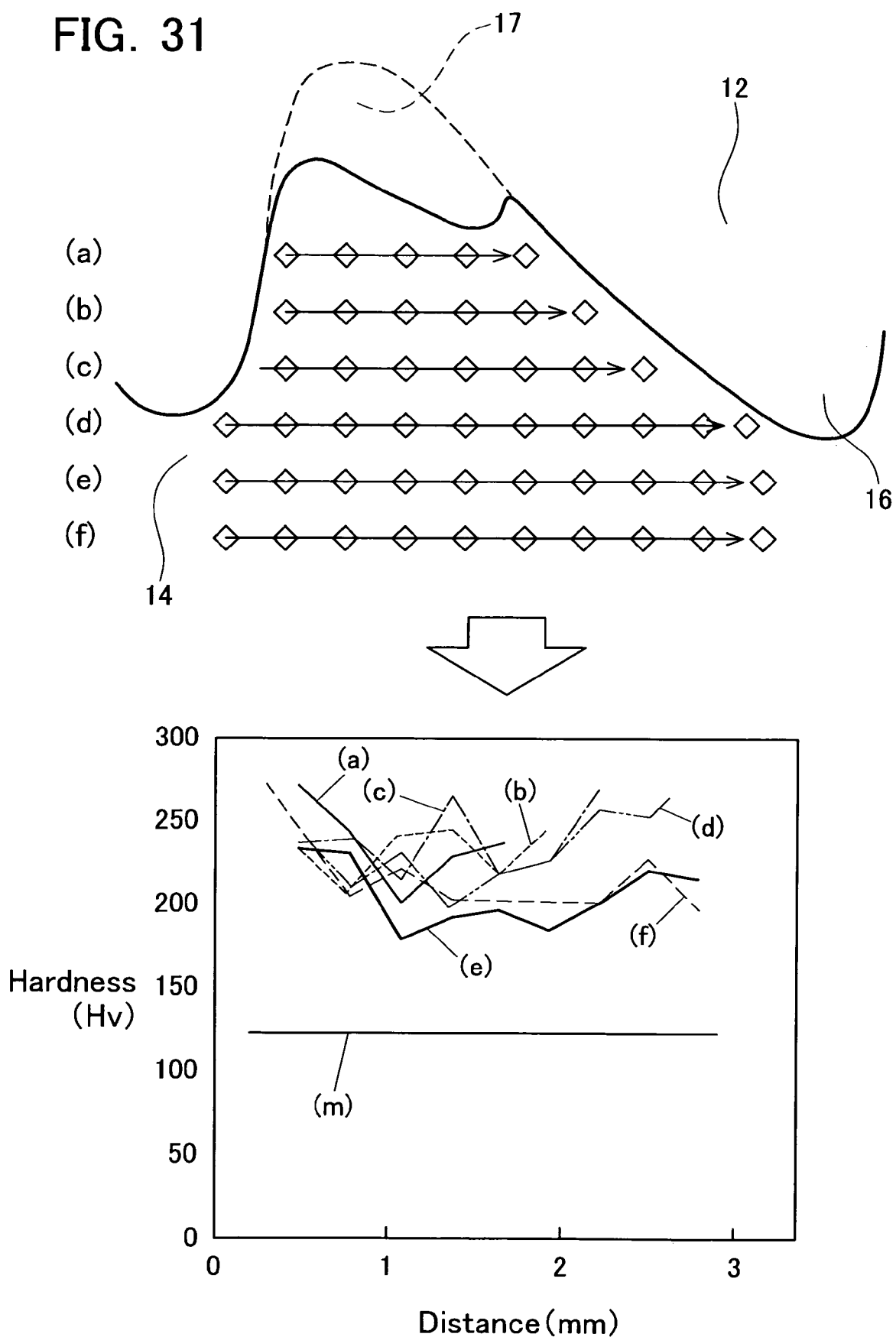
FIG. 31 shows the hardness measurement results for the plastic flow portion of a tubular member after pressure fitting.

The upper half of FIG. 31 shows a cross-sectional view of a state where the plastically deformed portion of the tubular member 14 has entered into the grooves 17 of the bar-shaped member 12. The bar-shaped member 12 is depicted by dotted lines, and the tubular member 14 is depicted by solid lines. The tubular member 14 enters into the grooves 17 to a depth of approximately "⅔ (two-thirds)". The fastening conditions are "δ/h=0.5" and the angle of inclination when the varied height section 20 and the tapered face 41 (the angle with respect to the direction of the axis 18) are viewed in side elevation is 30 degrees. Here, "δ" is "½ (half)" of the value obtained by subtracting the internal diameter D6 of the tubular member 14 from the external diameter D1 of the bar-shaped member 12. In other words, this is the distance in the diametrical direction of the overlapping portion of the projections 16 and the tubular member 14, when the bar-shaped member 12 and the tubular member 14 are mutually superimposed in the axial direction in the state before fastening. "h" is the height of the peaks of the projections 16 (the depth of the grooves 17). Consequently, the greater the value of "δ/h", the greater the pressure fitting between the bar-shaped member 12 and the tubular member 14. The hardness of the tubular member 12 was measured at respective points (forming a diamond shape) in each of six examples (a) to (f).

The lower half of FIG. 31 shows the hardness measurement results collected into a graph. The horizontal axis of the graph corresponds to the distance with respect to a prescribed position in each of the examples (a) to (f). The vertical axis corresponds to the measured hardness (Vicker's hardness Hv). The value (m) on the graph indicates the raw material hardness of the tubular member 14 (the hardness before pressure fitting). As the graph shows, after fastening, the hardness had increased in the case of all of the examples (a) to (f). In terms of the overall tendency, the portion which has entered deeply into the grooves 17 tends to have greater hardness.

Figure 32:
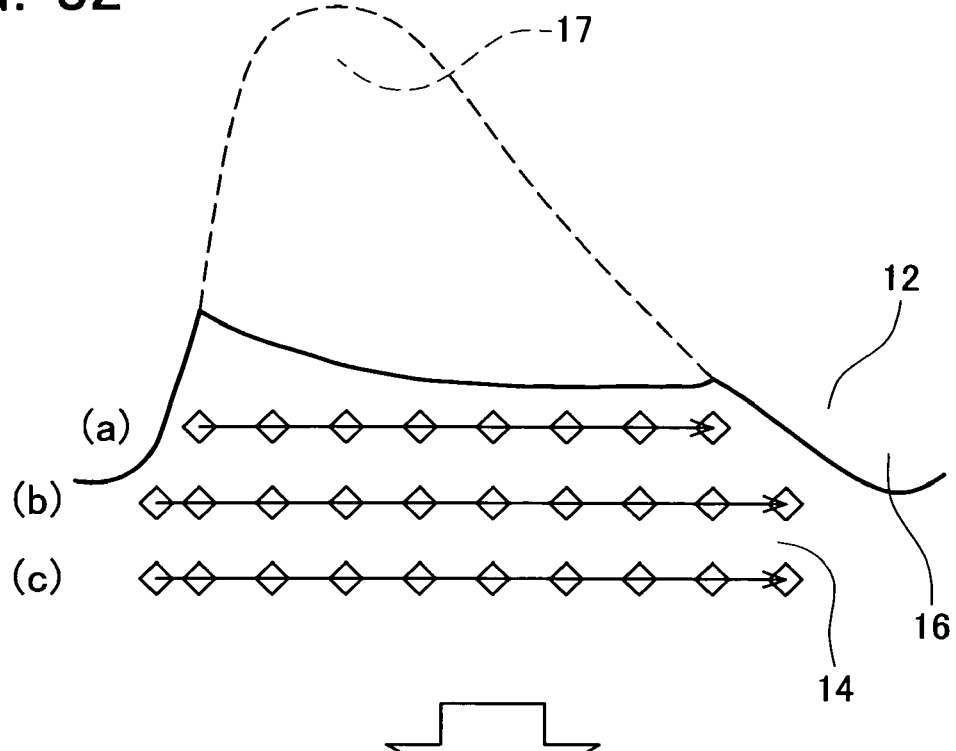
FIG. 32 shows the hardness measurement results for the plastic flow portion of a tubular member after pressure fitting.
Figure 32:
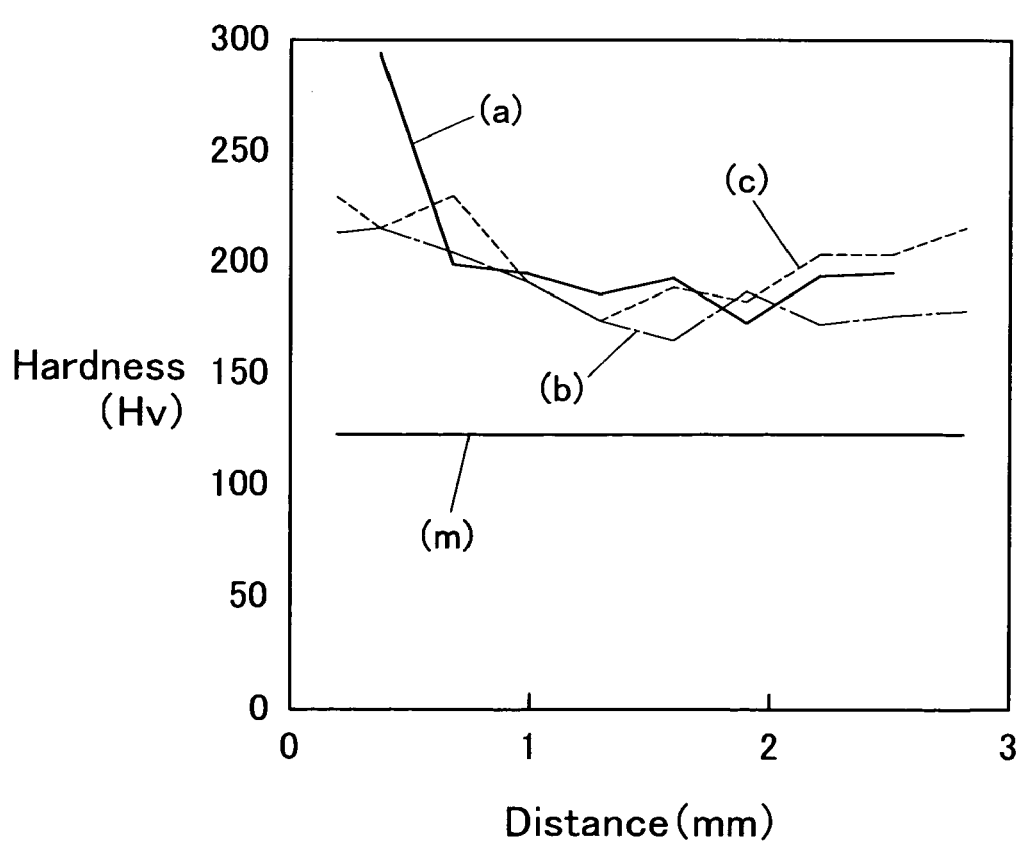

FIG. 32 shows the hardness measurement results in a case where the members were fastened under fastening conditions of "δ/h=0.25" and an angle of inclination of 30 degrees. As shown in the upper part of the FIG. 32, the plastically deformed portion of the tubular member 14 only flows to a shallow depth into the grooves 17 of the bar-shaped member 12. This is thought to be because "δ/h" has a small value of "0.25". Even so, as the graph in the lower half of FIG. 32 reveals, a processing and curing effect occurs and the hardness is high.

Figure 33:
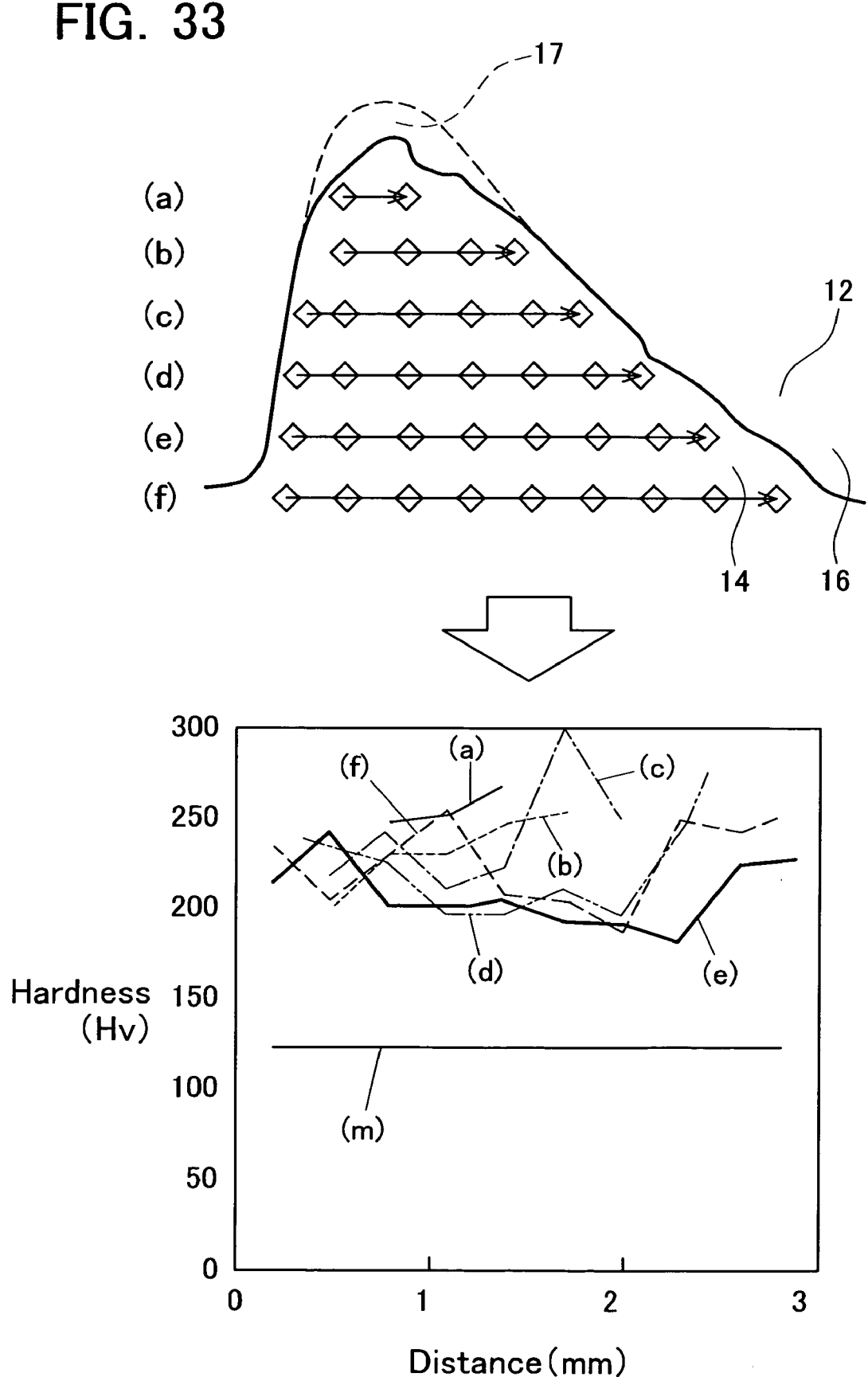
FIG. 33 shows the hardness measurement results for the plastic flow portion of a tubular member after pressure fitting.

FIG. 33 shows the hardness measurement results in a case where the members were fastened under fastening conditions of "δ/h=0.75" and an angle of inclination of 30 degrees. As shown in the upper half of FIG. 33, the tubular member 14 enters deeply into the grooves 17. The hardness is high in the case of all of the examples (a) to (f). Since the tubular member 14 enters deeply into the grooves 17 and the hardness becomes high, then the fastening strength of the bar-shaped member 12 and the tubular member 14 with respect to rotation about the axis becomes greatest when the members are fastened under the present fastening conditions.

Figure 34:
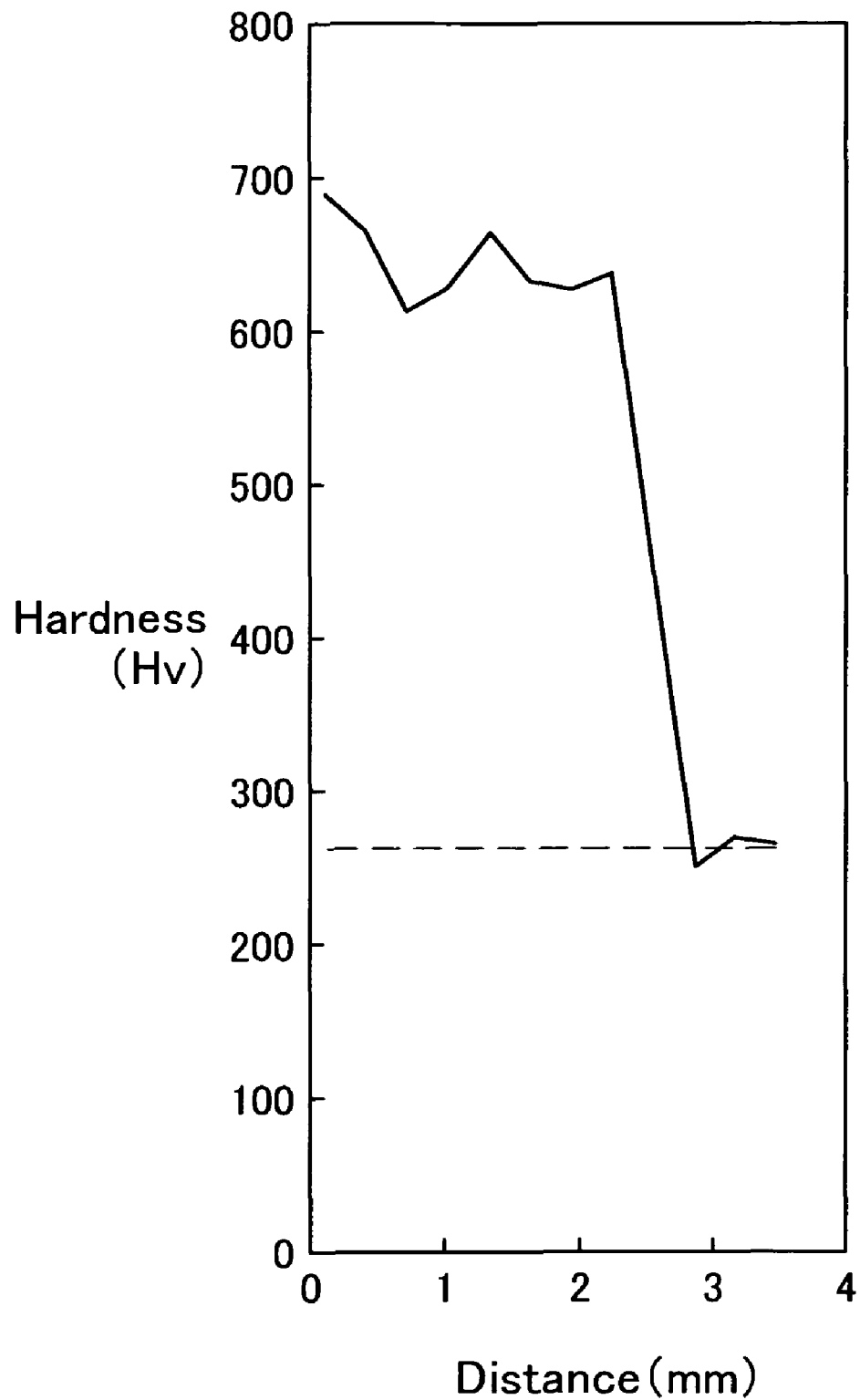
FIG. 34 shows the hardness measurement results for the projecting portion of a bar-shaped member after pressure fitting.

FIG. 34 is a graph showing the hardness of the projections 16 after fastening under fastening conditions of "δ/h=0.5" and an angle of inclination of 30 degrees (the same conditions as in FIG. 31). The horizontal axis of the graph corresponds to the distance from the top face of the projections 16 in the direction of the axis 18 of the bar-shaped member 12. The vertical axis of the graph corresponds to the measured hardness (Vicker's hardness Hv). The solid line on the graph indicates the measured hardness and the dotted line indicated the raw material hardness of the bar-shaped member 14. The hardness of the projections 16 is substantially uniform up to a distance of approximately 2 (mm), and as the distance becomes greater than this, the hardness declines sharply to the raw material hardness.

The fastening technology described in embodiments 1 to 5 above can be applied to fasten together members of various types.

Figure 35:
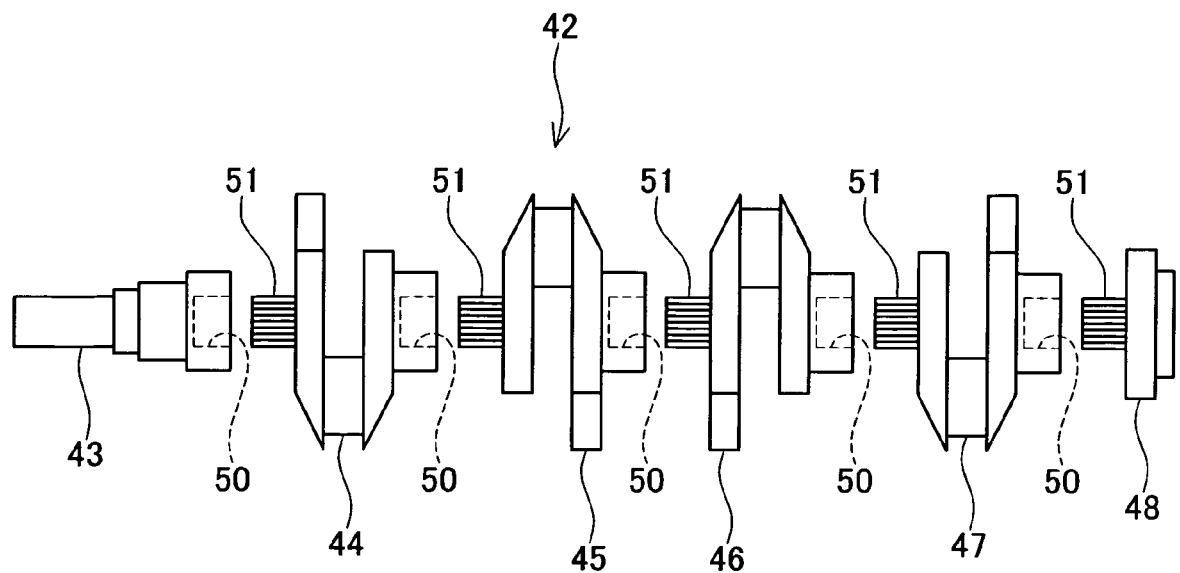
FIG. 35 shows a state before the fastening together of sub-components of a crankshaft.
Figure 36:
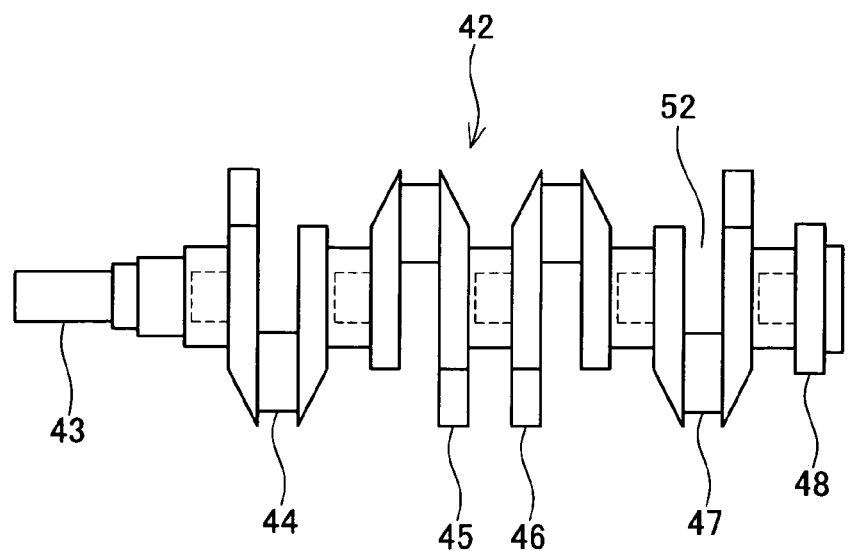
FIG. 36 shows a crankshaft in a state where sub-components have been fastened together by pressure fitting.

FIG. 35 shows a crank shaft 42 having sub-components 43 to 48. A recess section 50 is formed in the sub-component 43. Recess sections 50 and serrations 51 having a plurality of projections are formed respectively in the sub-components 44 to 47. A serration 51 is formed in the sub-component 48. FIG. 36 shows a state where the sub-components 43 to 48 are fastened together by pressure fitting the serrations 51 into the recess sections 50, thereby completing a crankshaft 42.

In the prior art, a crank shaft is manufactured as a single body. In this case, the gaps 52 indicated in FIG. 36 are processed by hot forging. Even if it is sought to reduce the width of the mold used to forge the gaps 52, there are limitations. Therefore, it has not been possible to reduce the length of the crankshaft in the axial direction. According to the fastening technology of the present invention, since the crankshaft 42 is completed by fastening together the sub-components 43 to 48, then it is not necessary to process the gaps 52 by hot forging. Consequently, the length of the crankshaft 42 in the axial direction can be made smaller than in the prior art.

Furthermore, in the crankshaft of a V type engine, then a twisting process is required if the crankshaft is manufactured as a single body. According to the fastening technology of the present invention, since the positional relationship between the recess sections and the serrations in terms of axial rotation can adjusted during their fastening, then it is possible to omit the twisting step.

The sub-components 44 to 48 can each be made from a plurality of further subsidiary sub-components, and the technology of the present invention can also be applied to the fastening together such sub-components.

Figure 37:
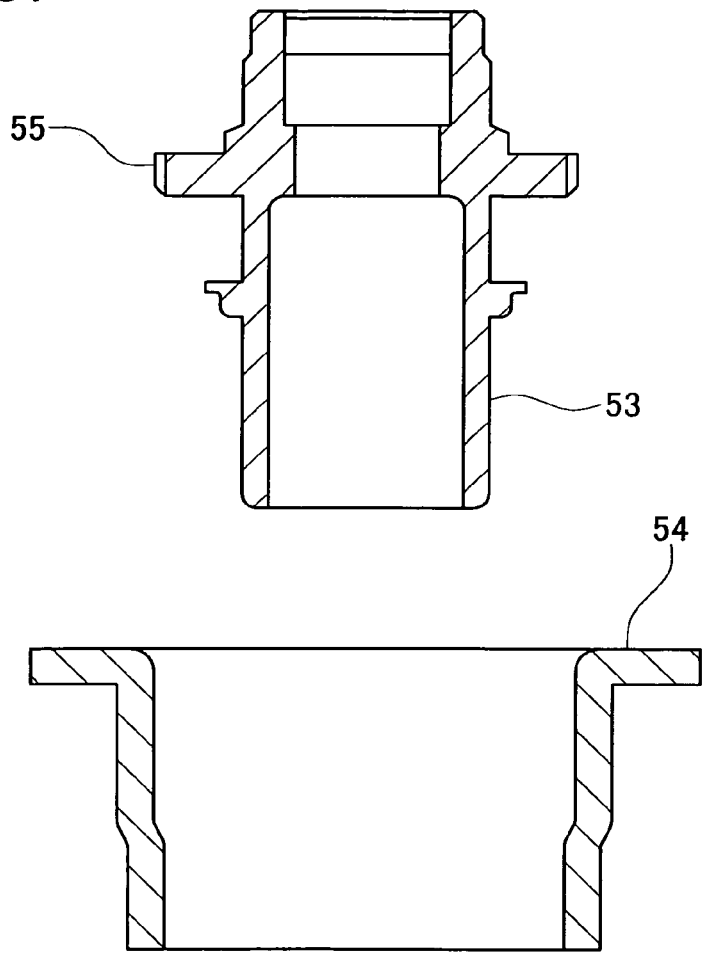
FIG. 37 is a cross-sectional diagram showing a state before the fastening together of a shaft section and a flange section of an electric motor.
Figure 38:
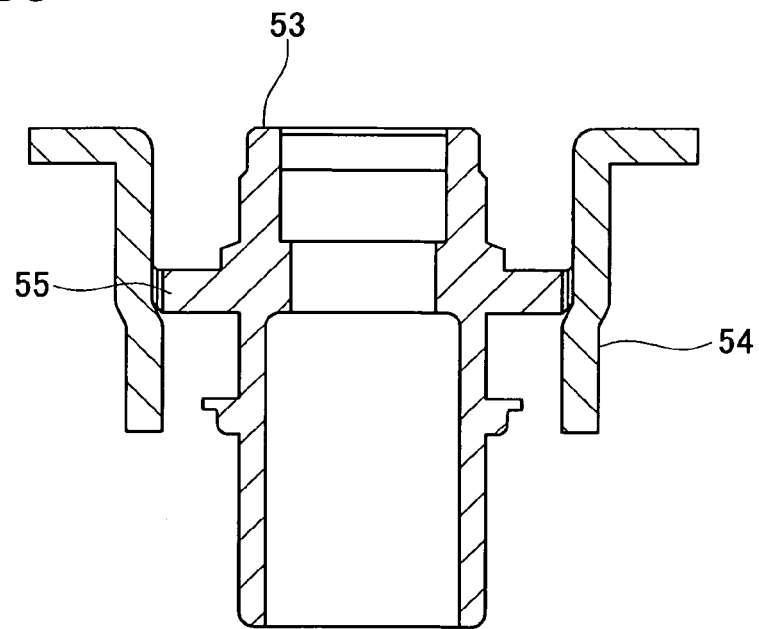
FIG. 38 is a cross-sectional diagram showing a state before the fastening together by pressure fitting of a shaft section and a flange section of an electric motor.

FIG. 37 shows a shaft section 53 and a flange section 54 of an electric motor. A serration 55 is formed in the shaft section 53. FIG. 38 shows a state where the shaft section 53 and the flange section 54 have been fastened together by means of the fastening technology according to the present invention.

Figure 39:
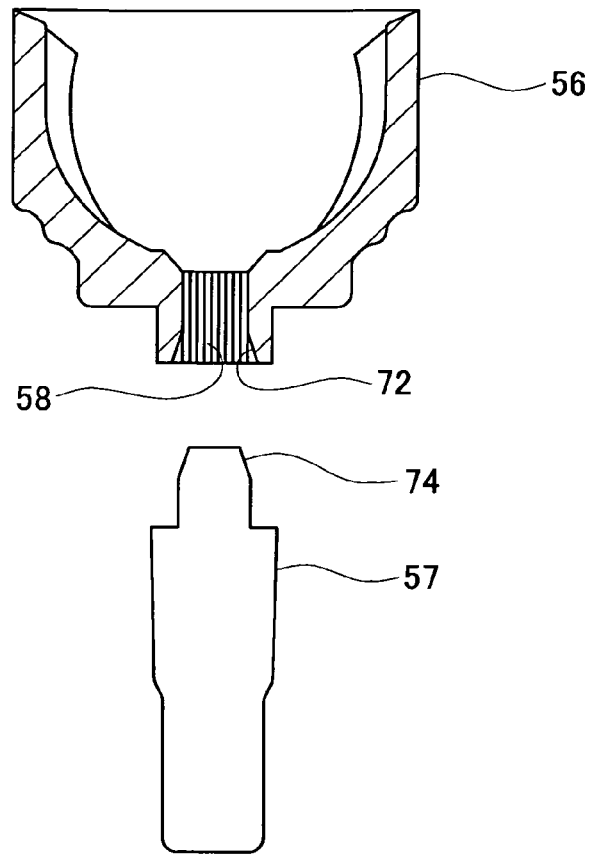
FIG. 39 is a cross-sectional diagram showing a state before the fastening together of an outer race and a tulip of a constant velocity joint.
Figure 40:
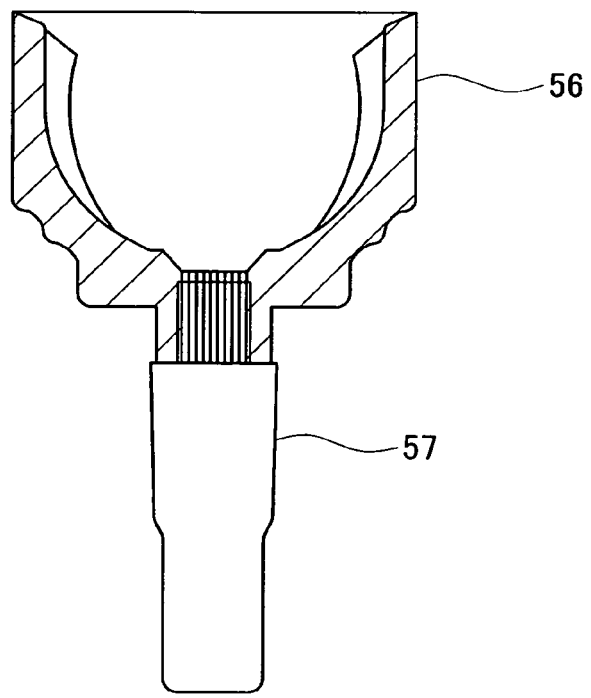
FIG. 40 is a cross-sectional diagram showing a state in which an outer race and a tulip of a constant velocity joint have been fastened together by pressure fitting.

FIG. 39 shows an outer race 56 and a tulip 57 of a constant velocity joint. The outer race 56 has a serration 58 formed on the inner circumferential surface thereof. The internal diameter of the serration of the outer race 56 increases gradually toward the opening, in the end portion 72 thereof. One end portion 74 of the tulip 57 decreases gradually in diameter. As shown in FIG. 40, the outer race 56 and the tulip 57 are fastened together by means of the fastening technology according to the present invention.

Figure 41:
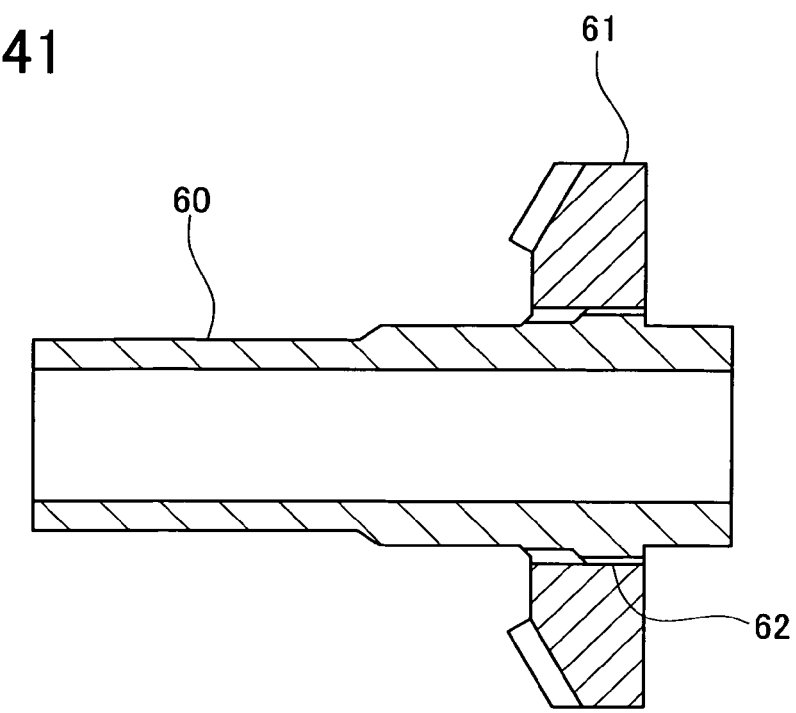
FIG. 41 is a cross-sectional diagram showing a state where a shaft and a ring gear have been fastened together by pressure fitting.
Figure 42:
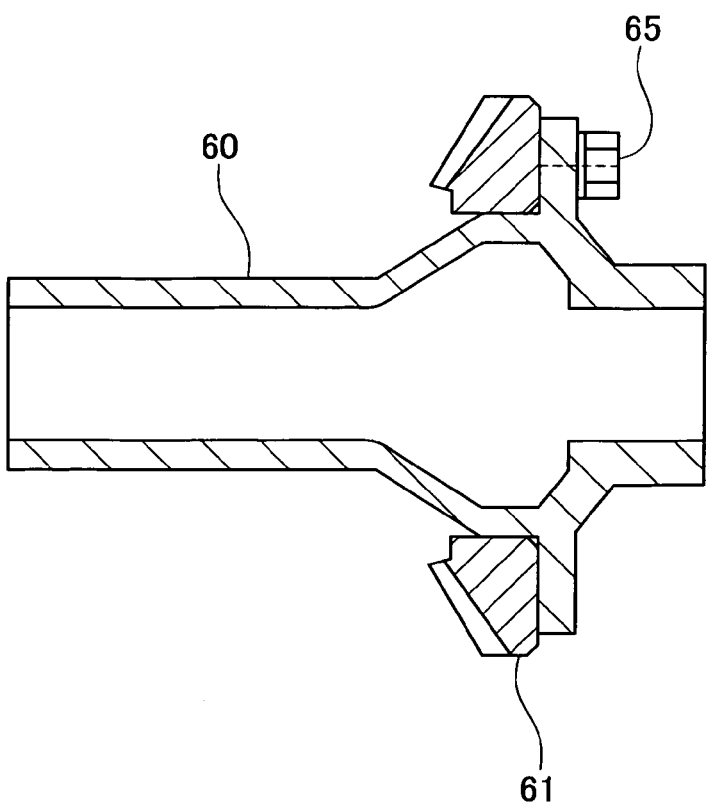
FIG. 42 is a cross-sectional diagram showing a state where a shaft and a ring gear have been fastened together by a bolt.

FIG. 41 shows a state where a shaft 60 and a ring gear 61 are fastened together by means of the fastening technology according to the present invention. A serration 62 is formed on the outer circumferential portion of the shaft section 60. On the other hand, if the fastening technology according to the present invention is not used, then the shaft 63 and the ring gear 61 must be fastened together by means of a bolt as shown in FIG. 42, and hence the number of components increases.

The fastening technology according to the present invention can also be applied suitably to the fastening together of the members stated below, for example, in addition to the foregoing examples.

(1) Fastening together of a rear axle shaft and flange (formed as a single body in the prior art). The manufacturing equipment can be made more compact in size.

(2) Fastening together of an engine manifold and flange (joined by welding in the prior art). Joint reliability is improved.

(3) Fastening together of constituent elements of a steering mechanism (fastening by light pressure fitting using splines in the prior art). The fastening strength is improved.

(4) Fastening together of joint yoke and shaft in propeller shaft, or fastening together of components in a transmission mechanism (joined together by electron beam welding in the prior art). Costs can be reduced and fastening strength is improved.

(5) Fastening together of an axial component and a component having a shape comprising a trough and a flange (for example, the rear shaft of a vehicle).

Since projections are formed on the inner side of the tubular member and pressure fitting is carried out from the side where the peaks of the projections are of lower height, then it is also possible to fasten the tubular member and the bar-shaped member together by causing plastic deformation of the bar-shaped member.

According to the fastening technology of the present invention, since the members are pressure fitted from the side where the peaks of the projections are of lower height, then plastic deformation is carried out efficiently.

Specific examples of the present invention were described in detail above, but these are no more than examples and do not limit the scope of the claims. The technology described in the claims includes various modifications and alterations of the specific examples which were described above.

Moreover the technical elements described in the specification and the drawings display technical utility either independently or in various combinations, and are not limited to the combinations stated in the claims in the present application. Furthermore, the technology described as examples in the present specification or drawings achieves a plurality of objects simultaneously, and has technical utility by achieving any one of these objects.

The invention claimed is:

1. A method of manufacturing an assembly member in which a first member and a second member are fastened together, the method comprising:
    forming a bar-shaped section on a first member;
    forming a hole in a second member; and
    pressure fitting the bar-shaped section of the first member into the hole of the second member, wherein
    a diameter of a circumscribed circle which circumscribes a cross-section perpendicular to an axis of the bar-shaped section is greater than a diameter of an inscribed circle which inscribes a cross-section perpendicular to an axis of the hole,
    a diameter of an inscribed circle which inscribes the cross-section perpendicular to the axis of the bar-shaped section is smaller than a diameter of a circumscribed circle which circumscribes the cross-section perpendicular to the axis of the hole,
    a tapered section, in which the cross-section perpendicular to the axis reduces in the pressure fitting direction of the bar-shaped section, is formed on a side face of one of the bar-shaped section and the hole that has greater hardness,
    peaks of projections having a height in a radial direction are formed repeatedly in the circumferential direction extending individually in the axial direction on the side face of the one of the bar-shaped section and the hole that has greater hardness, and
    the peaks extending individually in the axial direction each comprise, in a continuously formed fashion, a first portion in which the height in the radial direction of each of peaks of each projection increases uniformly in the axial direction and a second portion in which the height in the radial direction of the each peak of the each projection is maintained at a uniform height in the axial direction,
    wherein first and second surfaces of the each projection extend from the each peak of the each projection extending in the axial direction to troughs between the each projection and adjacent projections in the circumferential direction of the each projection, the first and second surfaces having asymmetric inclines with respect to a line in the radial direction that passes through the axis of the one of the bar-shaped section and the hole that has greater hardness and the each peak of the each projection.

2. The method of manufacture according to claim 1, wherein projections extending in the axial direction are formed repeatedly in the circumferential direction on the side face of the one of the bar-shaped section and the hole that has greater hardness, and peaks of the projections form the peaks extending in the axial direction.

3. The method of manufacture according to claim 2, wherein on the side face of the one of the bar-shaped section and the hole that has greater hardness, walls extending partially along a circular circumference which passes through an intermediate height between the peak and trough of the projections are formed at a plurality of positions having rotational symmetry.

* * * * *